United States Patent
Didier

(10) Patent No.: US 11,145,932 B2
(45) Date of Patent: Oct. 12, 2021

(54) BATTERY CELL MODULE AND BATTERY PACK

(71) Applicant: MILWAUKEE ELECTRIC TOOL CORPORATION, Brookfield, WI (US)

(72) Inventor: Theodore W. Didier, Mequon, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 210 days.

(21) Appl. No.: 16/573,649

(22) Filed: Sep. 17, 2019

(65) Prior Publication Data

US 2020/0099022 A1    Mar. 26, 2020

Related U.S. Application Data

(60) Provisional application No. 62/735,215, filed on Sep. 24, 2018.

(51) Int. Cl.
  *H01M 50/291*  (2021.01)
  *H01M 50/213*  (2021.01)
  *H01M 50/293*  (2021.01)
  *H01M 50/247*  (2021.01)
  *H01M 50/202*  (2021.01)

(52) U.S. Cl.
  CPC ....... *H01M 50/291* (2021.01); *H01M 50/202* (2021.01); *H01M 50/213* (2021.01); *H01M 50/247* (2021.01); *H01M 50/293* (2021.01); *H01M 2220/30* (2013.01)

(58) Field of Classification Search
  None
  See application file for complete search history.

(56) References Cited

U.S. PATENT DOCUMENTS

| 3,342,645 | A |   | 9/1967  | Godard et al. |
|-----------|---|---|---------|---------------|
| 4,554,221 | A | * | 11/1985 | Schmid ............... H01M 50/213 429/1 |
| 5,283,137 | A |   | 2/1994  | Ching |
| 6,023,146 | A |   | 2/2000  | Casale et al. |
| 8,129,047 | B2 |  | 3/2012  | Damsohn et al. |
| 8,367,239 | B2 |  | 2/2013  | Hermann |

(Continued)

FOREIGN PATENT DOCUMENTS

| CN | 201104325 Y | 8/2008 |
| CN | 201845840 U | 5/2011 |

(Continued)

*Primary Examiner* — Gregg Cantelmo
(74) *Attorney, Agent, or Firm* — Michael Best & Friedrich LLP

(57) ABSTRACT

A battery cell module configured to be at least partially located within a housing of a battery pack. The battery cell module includes a frame. The frame includes a first frame half and a second frame half. The first frame half and the second frame half define a battery cell compartment for receiving a battery cell. The first frame half includes a first end wall and a wedge member affixed to the first end wall. The wedge member includes a first wedge portion and a second wedge portion. The first wedge portion and the second wedge portion define a post opening. The second frame half includes a second end wall and a post affixed to the second end wall at a first end of the post. The post is configured to be inserted into the post opening of the wedge member.

20 Claims, 21 Drawing Sheets

(56) References Cited

U.S. PATENT DOCUMENTS

| | | | |
|---|---|---|---|
| 8,546,007 | B2 | 10/2013 | Lee et al. |
| 8,582,294 | B2 | 11/2013 | Guerin et al. |
| 8,945,746 | B2 * | 2/2015 | Kwag ..................... G01V 3/36 |
| | | | 429/99 |
| 8,999,540 | B2 * | 4/2015 | Bang .................. H01M 10/613 |
| | | | 429/72 |
| 9,040,185 | B2 | 5/2015 | Chuang et al. |
| 9,153,799 | B2 | 10/2015 | Kim et al. |
| 9,172,115 | B2 | 10/2015 | Kolden et al. |
| 9,190,641 | B2 | 11/2015 | Bae |
| 9,685,644 | B2 | 6/2017 | Lampe-Onnurud et al. |
| 9,705,113 | B2 | 7/2017 | Lang |
| 9,979,046 | B2 | 5/2018 | Li |
| 2005/0271934 | A1 | 12/2005 | Kiger et al. |
| 2006/0028183 | A1 | 2/2006 | Izawa et al. |
| 2008/0314792 | A1 * | 12/2008 | Daeschler ........... H01M 50/213 |
| | | | 206/705 |
| 2012/0251857 | A1 | 10/2012 | Neuhold et al. |
| 2013/0143074 | A1 | 6/2013 | Kim |
| 2015/0155544 | A1 | 6/2015 | Beer et al. |
| 2016/0247634 | A1 | 8/2016 | Nieva Fatela et al. |
| 2018/0006282 | A1 | 1/2018 | Favaretto |

FOREIGN PATENT DOCUMENTS

| | | |
|---|---|---|
| CN | 103378335 A | 10/2013 |
| CN | 103390762 B | 11/2013 |
| CN | 104201304 B | 12/2014 |
| CN | 204905322 B | 12/2015 |
| DE | 102008059972 A1 | 6/2010 |
| EP | 2290731 B1 | 3/2011 |
| WO | 2018055256 A1 | 3/2018 |

\* cited by examiner

BATTERY CELL MODULE AND BATTERY PACK

RELATED APPLICATIONS

This application claims the benefit of U.S. Provisional Patent Application No. 62/735,215, filed Sep. 24, 2018, the entire content of which is hereby incorporated by reference.

FIELD

Embodiments described herein relate to battery packs for use with electrical devices, such as tools.

SUMMARY

Cordless tools, such as power tools (e.g., drills, drivers, saws, nailers, grinders, etc.), outdoor tools (e.g., trimmers, pole saws, blowers, etc.), etc., and other electrical devices (e.g., motorized devices, non-motorized devices, chargers, etc.) (generally referred to herein as "devices" or a "device") are powered by a rechargeable battery pack. The battery pack may be detached from a device for charging or for use with other devices.

Embodiments described herein provide a battery pack that includes a housing, a plurality of battery cells located within the housing, and a battery cell module. The battery cell module is at least partially located within the housing. The battery cell module is configured to support the plurality of battery cells. The battery cell module includes a frame. The frame includes a first frame half and a second frame half. The first frame half and the second frame half define a battery cell compartment for receiving the plurality of battery cells. The first frame half includes a first end wall and an elastically bendable wedge member affixed to the first end wall. The wedge member includes a first wedge portion and a second wedge portion. The first wedge portion and the second wedge portion define a post opening having a circular cross-section. The second frame half includes a second end wall and a post affixed to the second end wall at a first end of the post. The post is configured to be inserted into the post opening of the wedge member.

Embodiments described herein provide a battery pack that includes a housing, a plurality of battery cells located within the housing, and a battery cell module. The battery cell module is at least partially located within the housing. The battery cell module is configured to support the plurality of battery cells. The battery cell module includes a frame. The frame includes a first frame half and a second frame half. The first frame half and the second frame half define a battery cell compartment for receiving the plurality of battery cells. The first frame half includes a first end wall and a wedge member connected to the first end wall. The wedge member includes a first wedge portion and a second wedge portion. The first wedge portion and the second wedge portion define a post opening. The second frame half includes a second end wall and a post connected to the second end wall at a first end of the post. The post is configured to be inserted into the post opening of the wedge member.

Embodiments described herein provide a battery cell module configured to be at least partially located within a housing of a battery pack. The battery cell module includes a frame. The frame includes a first frame half and a second frame half. The first frame half and the second frame half define a battery cell compartment for receiving a battery cell. The first frame half includes a first end wall and a wedge member connected to the first end wall. The wedge member includes a first wedge portion and a second wedge portion. The first wedge portion and the second wedge portion define a post opening. The second frame half includes a second end wall and a post connected to the second end wall at a first end of the post. The post is configured to be inserted into the post opening of the wedge member.

In some embodiments, a battery pack includes a battery cell and a frame operable to position the battery cell. The frame defines a receptacle for receiving the battery cell. The frame includes a first frame portion with a positioning member having a first surface selectively engageable with the battery cell to position the battery cell relative to the first frame portion and a second surface. The frame also include a second frame portion with an activation member selectively engageable with the second surface to cause the first surface to engage the battery cell.

In some embodiments, the positioning member includes a wedge providing the first surface and the second surface. The battery pack may include a first cell and a second cell, and the first frame portion may include a first wedge selectively engageable with the first cell to position the first cell and a second wedge engageable with the second cell to position the second cell. The activation member may be selectively engageable with the first wedge to cause the first wedge to engage the first cell and with the second wedge to cause the second wedge to engage the second cell.

In some embodiments, the first frame portion includes a wedge member that provides the first wedge and the second wedge and defines an opening. A gap may be defined between the first wedge and the second wedge. Each wedge is configured to bend toward or away from one another to exert or relieve a compressive force against the battery cell. The activation member may include a projection (e.g., a post) that is insertable into the opening to engage the first wedge and the second wedge.

In some embodiments, the first frame portion includes a plurality of wedge members, and the second frame half includes a plurality of posts. Each post is configured to be inserted into a post opening of an associated wedge member. When the module frame is assembled with the battery cells, the posts are inserted into the post openings to cause the wedges to exert a compressive force against the battery cells to secure the battery cells in place within the internal frame.

In some embodiments, each post opening has a first cross-sectional area. Each post may have one portion with a second cross-sectional area (e.g., a fixed end) greater than a third cross-sectional area of another portion (e.g., a free end). The second cross-sectional area is greater than the first cross-sectional area.

In some embodiments, the battery pack includes an outer housing that defines a compartment. The cell module is supportable in the compartment. The battery pack includes a terminal electrically connected to the battery cell and operable to electrically connect to an electrical device.

Embodiments described herein provide a method of assembling a battery pack. The battery pack includes a battery cell and a frame operable to position the battery cell. The frame defines a receptacle for receiving the battery cell. The frame includes a first frame portion with a positioning member having a first surface selectively engageable with the battery cell to position the battery cell relative to the first frame portion and a second surface. The frame also includes a second frame portion having an activation member. The method includes positioning the battery cell in the receptacle and activating the positioning member to cause the first surface to engage and exert a compressive force against the battery cell.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
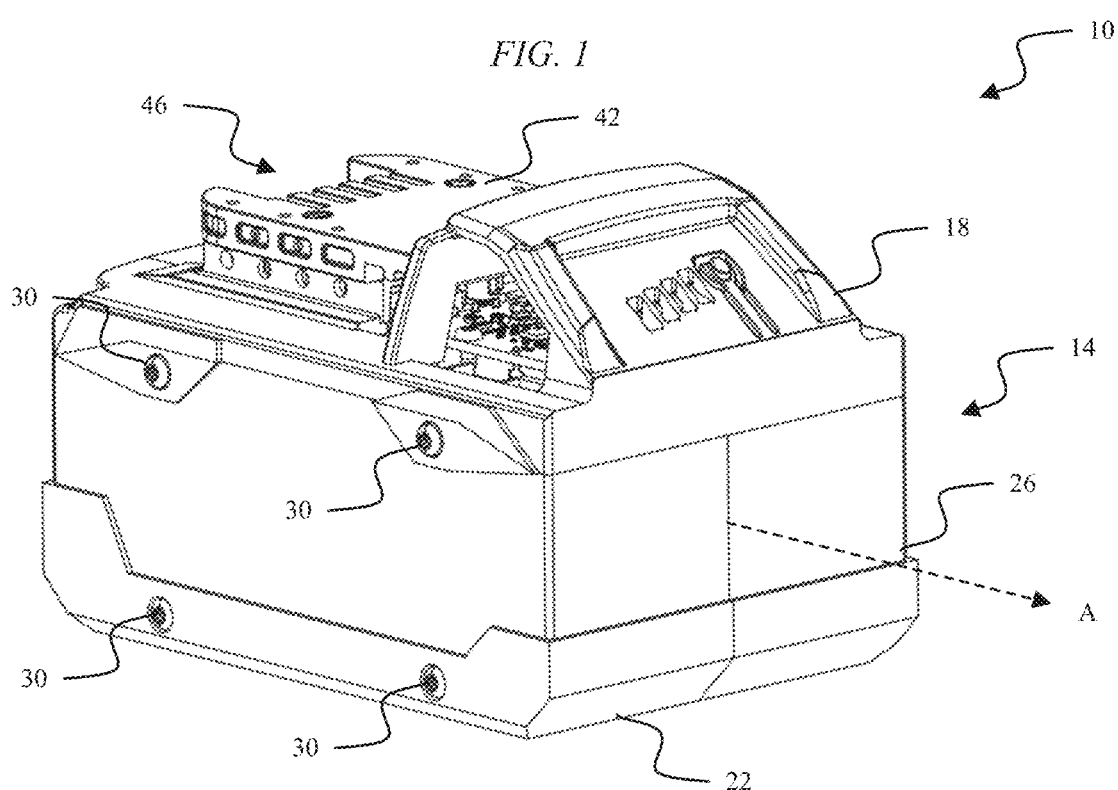
FIG. 1 is a perspective view of a battery pack operable with an electrical device, illustrated with the latch mechanism removed, according to embodiments described herein.
Figure 2:
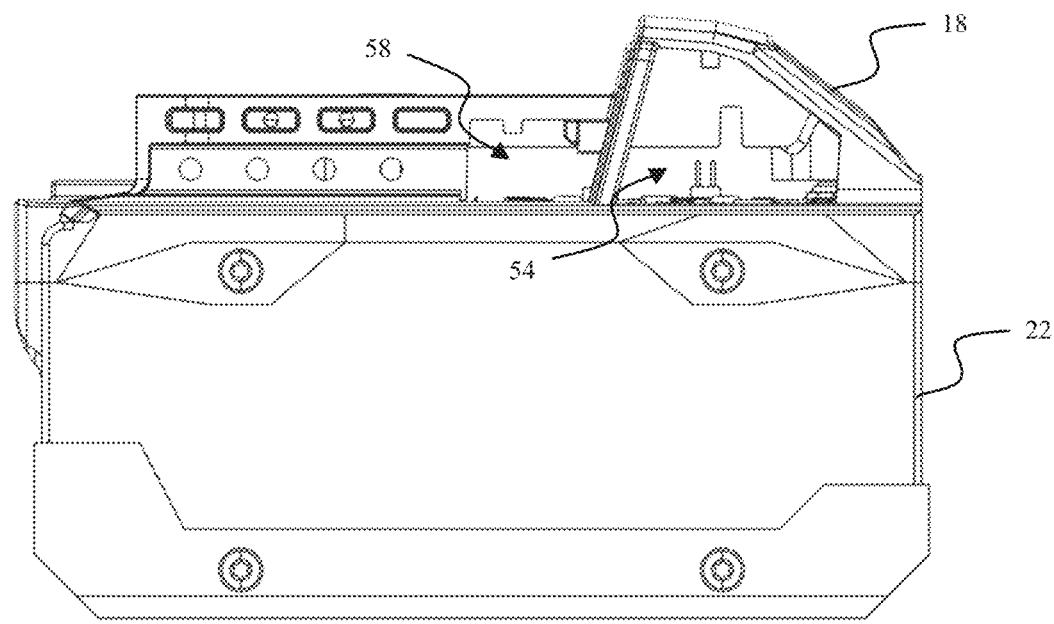
FIG. 2 is a side view of the battery pack of FIG. 1.
Figure 3:
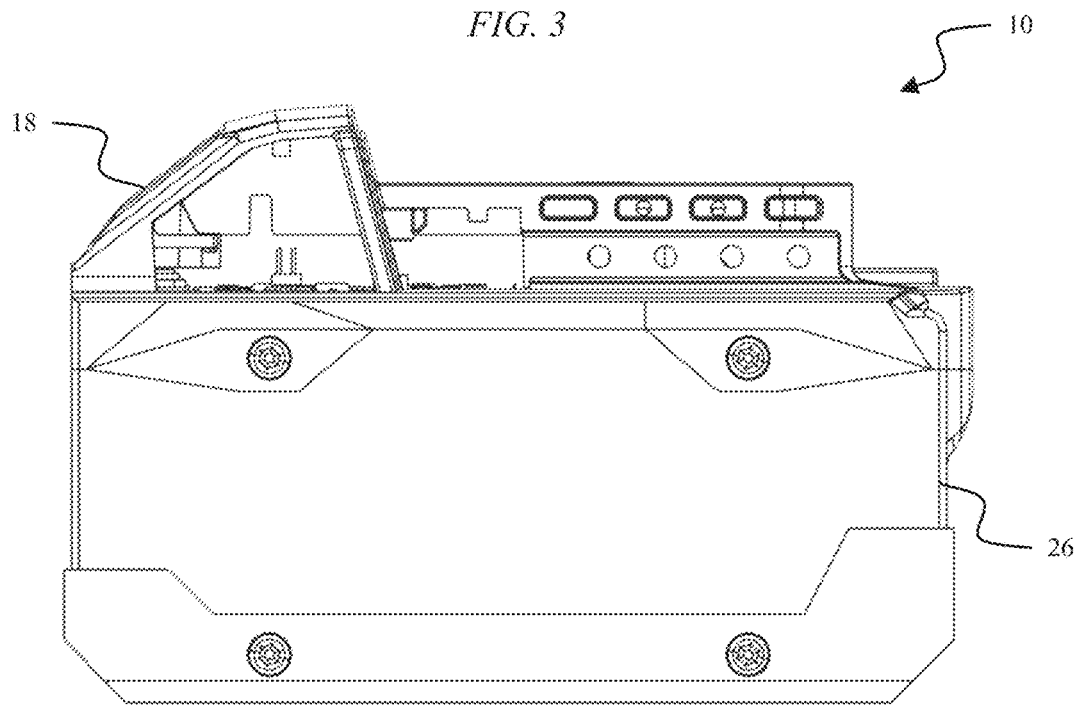
FIG. 3 is another side view of the battery pack of FIG. 1.
Figure 4:
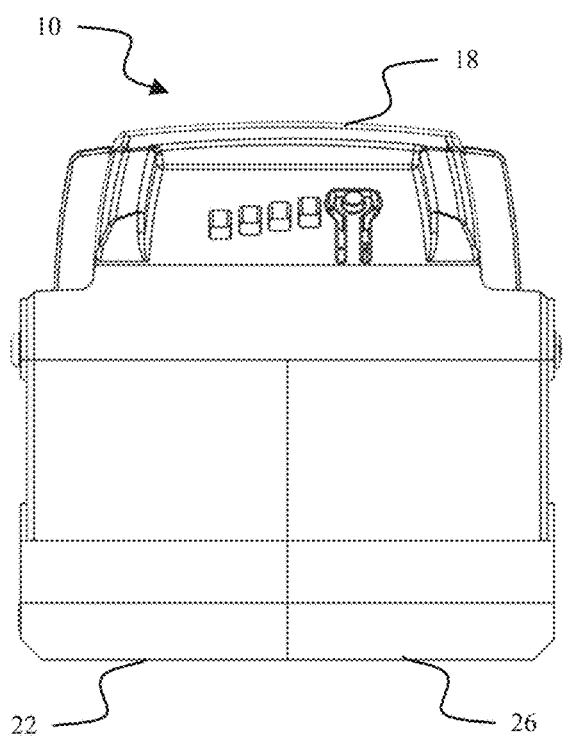
FIG. 4 is a front view of the battery pack of FIG. 1.
Figure 5:
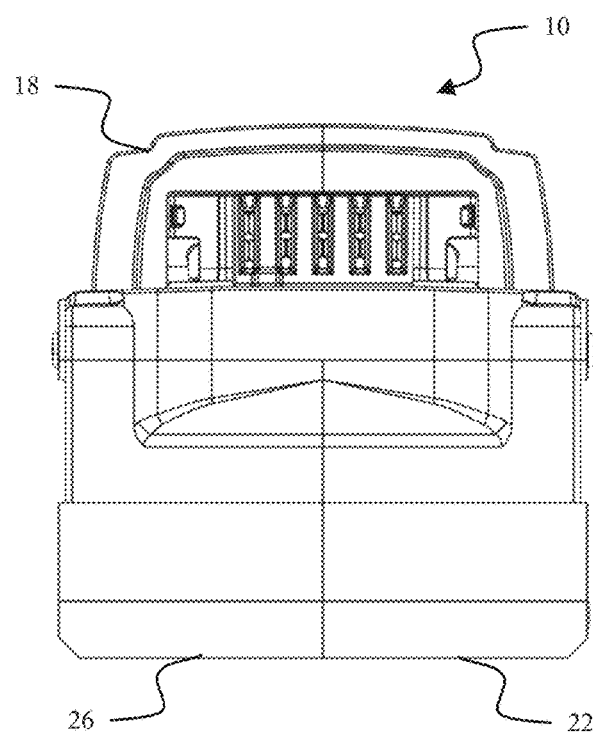
FIG. 5 is a rear view of the battery pack of FIG. 1.
Figure 6:
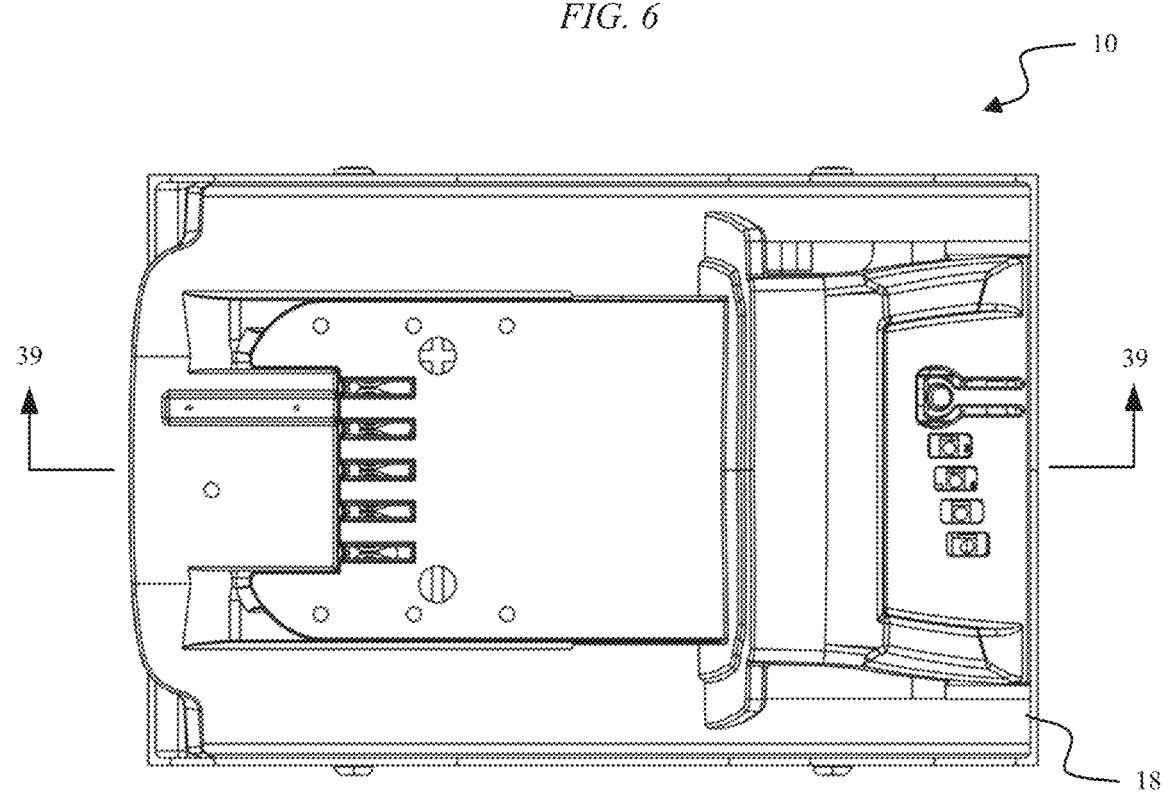
FIG. 6 is a top view of the battery pack of FIG. 1.
Figure 7:
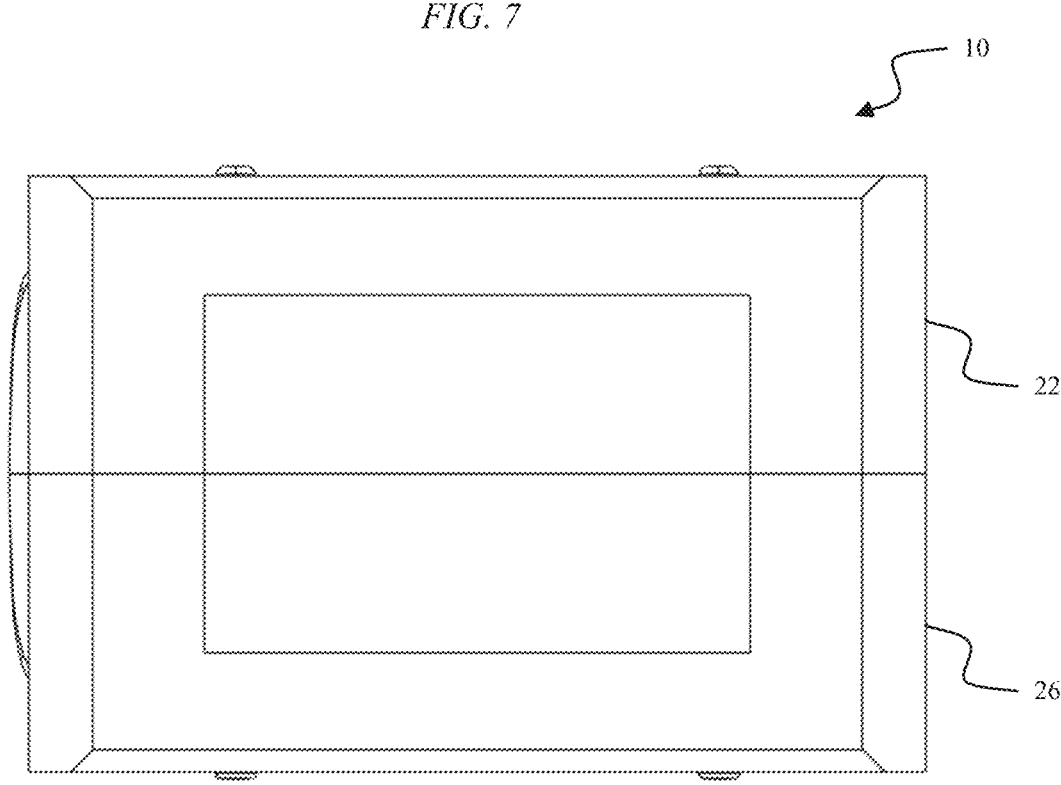
FIG. 7 is a bottom view of the battery pack of FIG. 1.

FIG. 1 illustrates a removable and rechargeable battery pack 10 operable to selectively power an electrical device, such as a power tool (e.g., a drill, a driver, a saw, a nailer, a grinder, etc.), an outdoor tool (e.g., a trimmer, a pole saw, etc.), etc., and another electrical device (e.g., a motorized device, a non-motorized device, etc.). The battery pack 10 is also connectable to a charger for charging.

Figure 8:
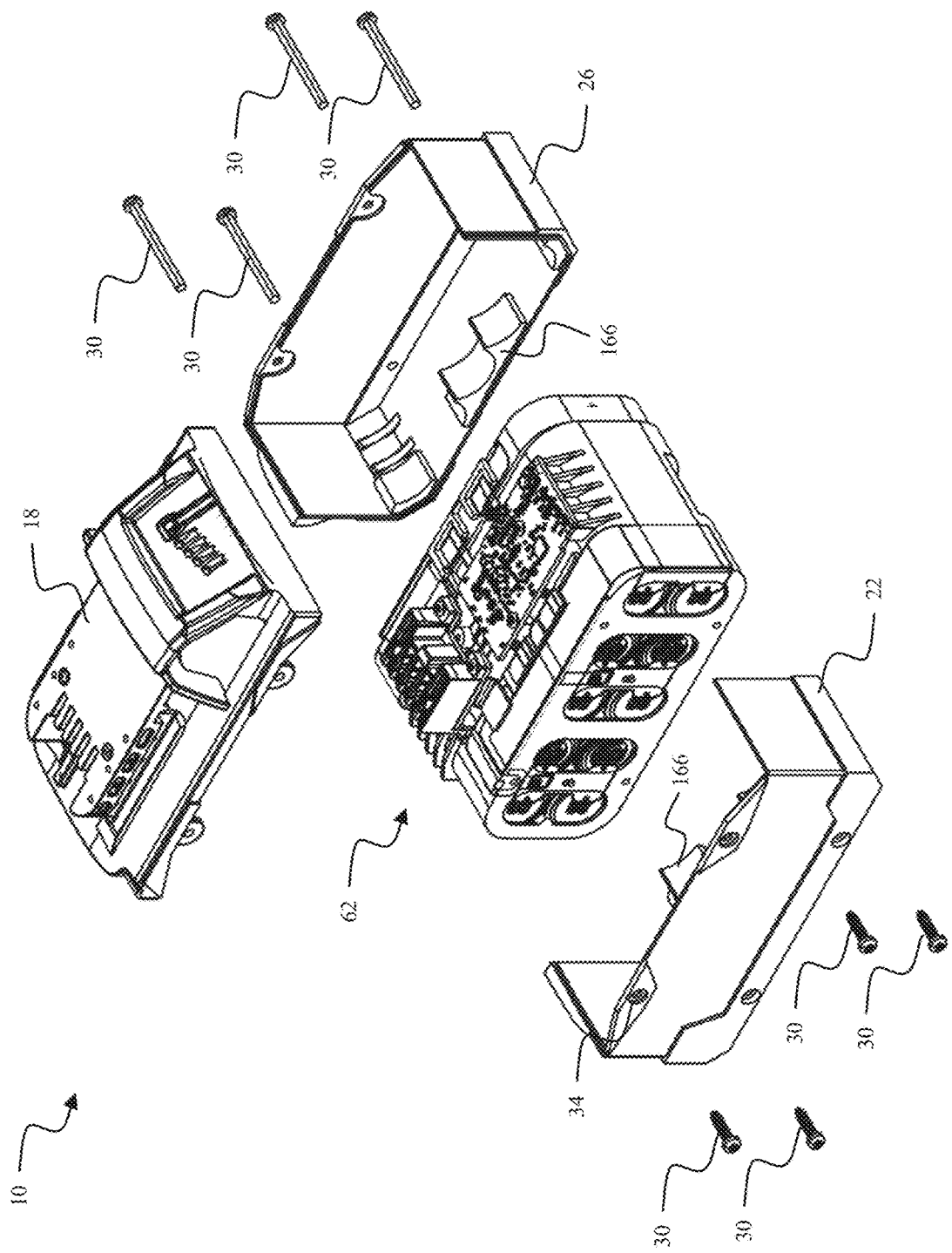
FIG. 8 is a partially exploded top perspective view of the battery pack of FIG. 1.
Figure 9:
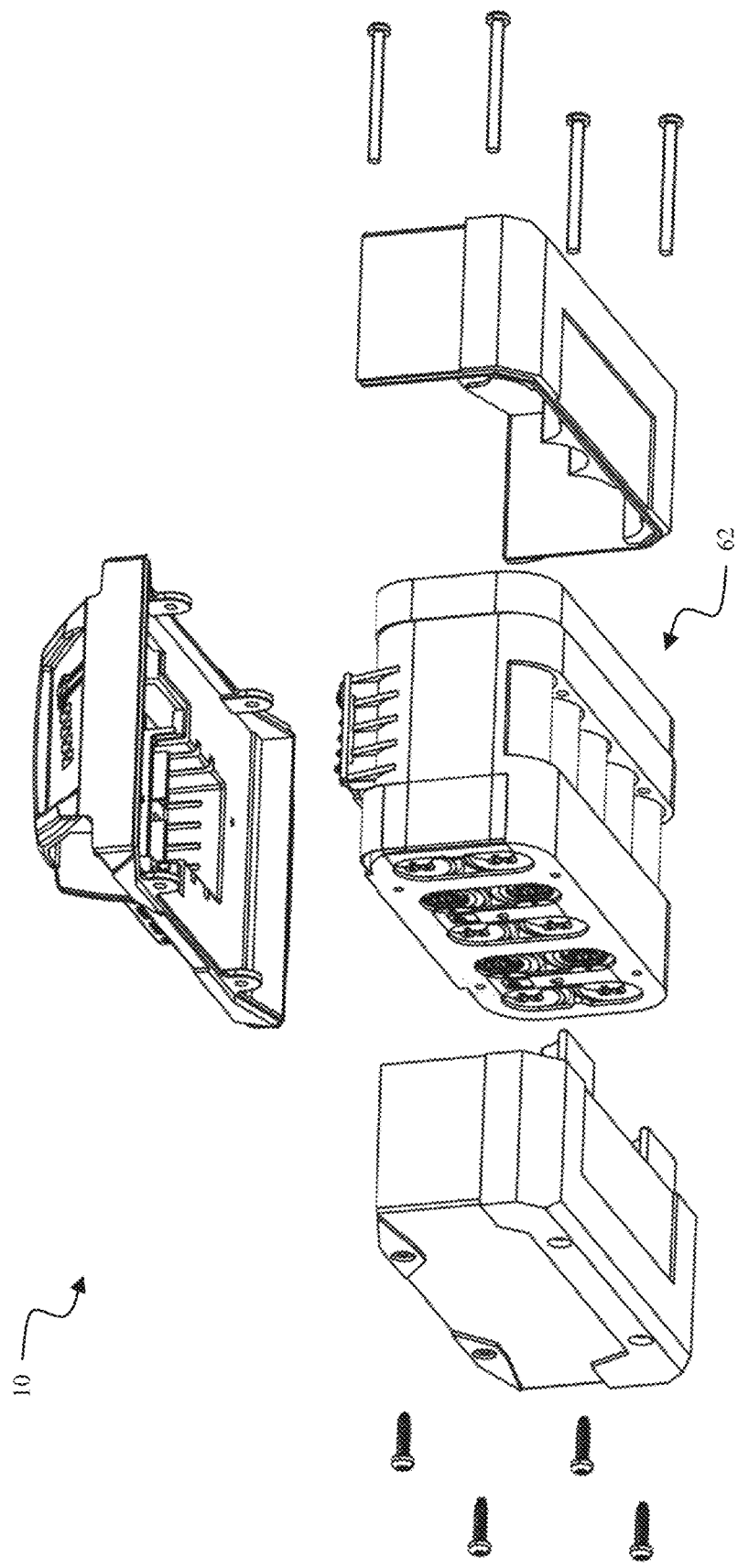
FIG. 9 is a partially exploded bottom perspective view of the battery pack of FIG. 1.

The battery pack 10 includes a housing or case 14 formed, in the illustrated construction, of an upper case portion 18, a first lower case portion 22, and a second lower case portion 26. In the illustrated construction, the case portions 18, 22, 26 are connected with threaded fasteners 30 (e.g., screws) that extend through complementary fastening holes 34 (see FIG. 8). In other constructions, the case portions 18, 22, 26 are connected with other suitable coupling means. Together, the portions 18, 22, 26 define an internal compartment C (see FIG. 39) within the case 14 containing internal components of the battery pack 10.

Figure 10:
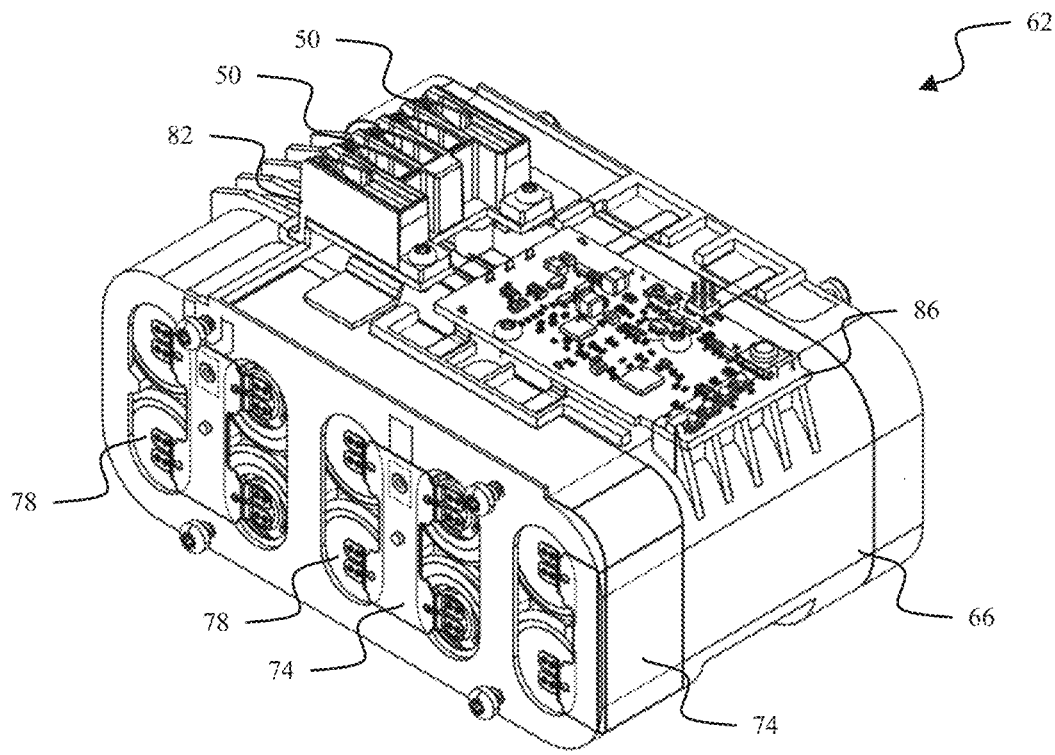
FIG. 10 is a top perspective view of a cell module of the battery pack of FIG. 1.
Figure 11:
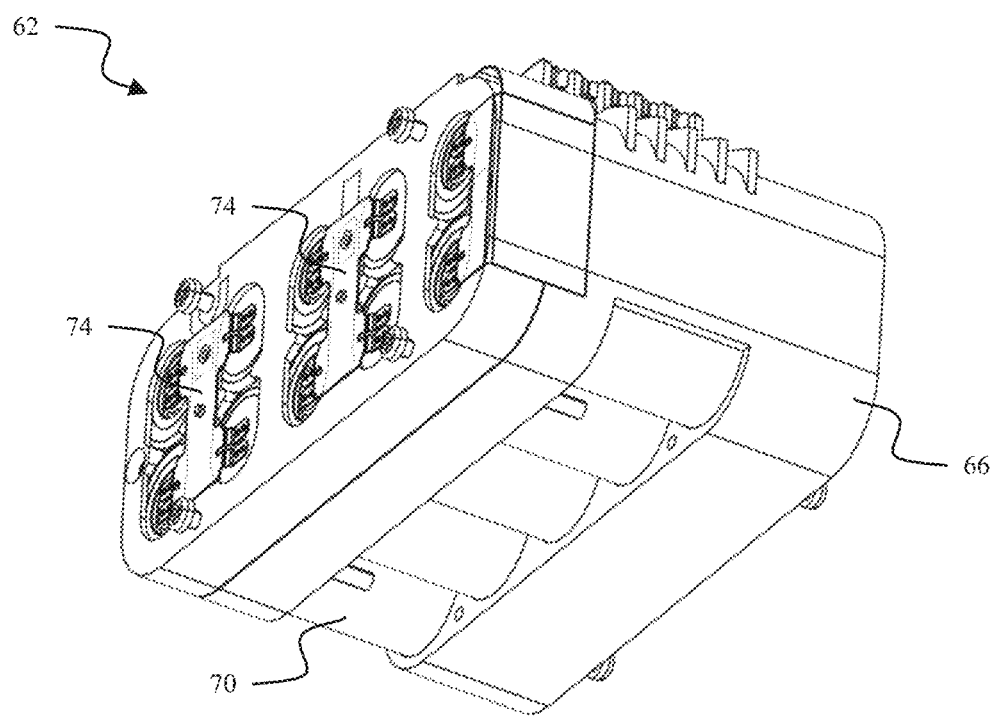
FIG. 11 is a bottom perspective view of the cell module of FIG. 10.
Figure 12:
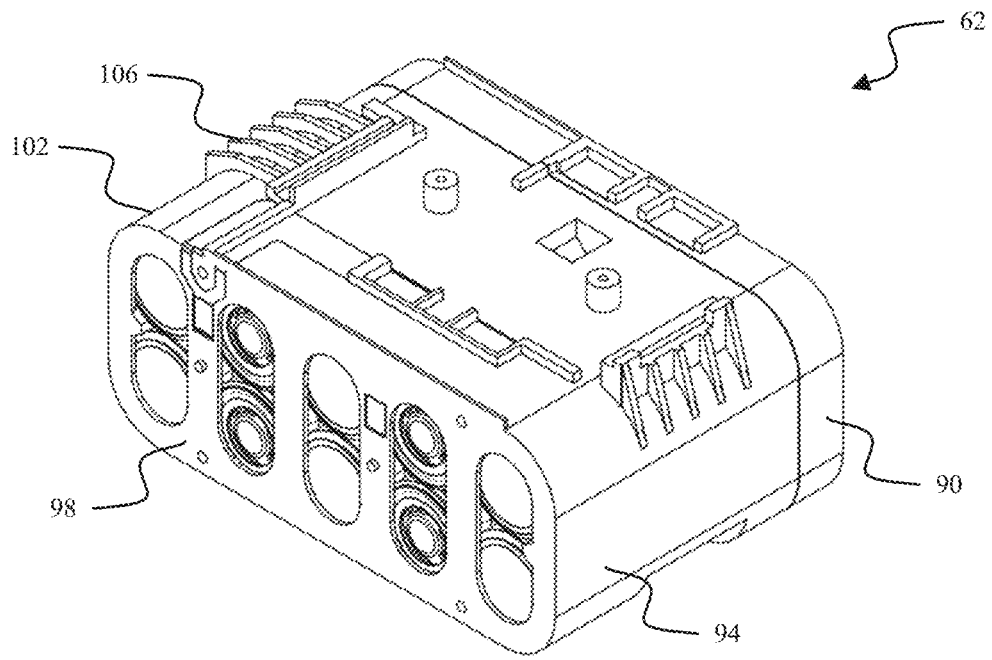
FIG. 12 is a top perspective view of a portion of the cell module of FIG. 10, with the printed circuit board ("PCB") and terminal block removed.
Figure 13:
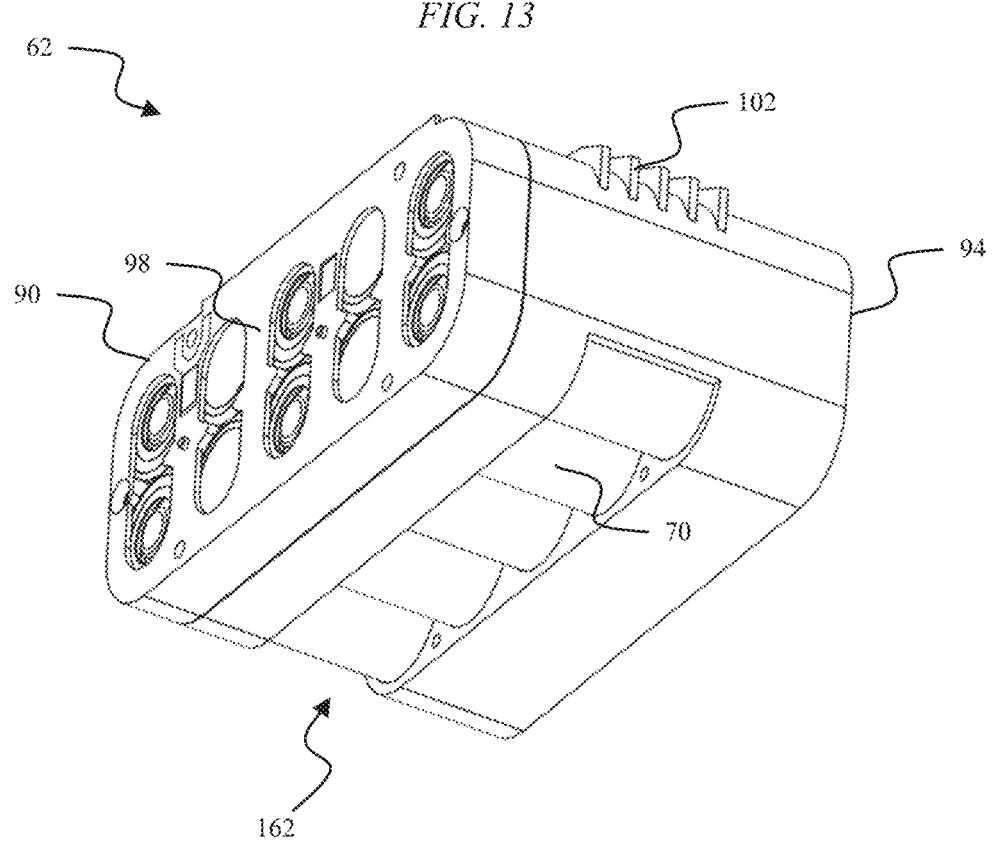
FIG. 13 is a bottom perspective view of the portion of the cell module of FIG. 12.
Figure 14:
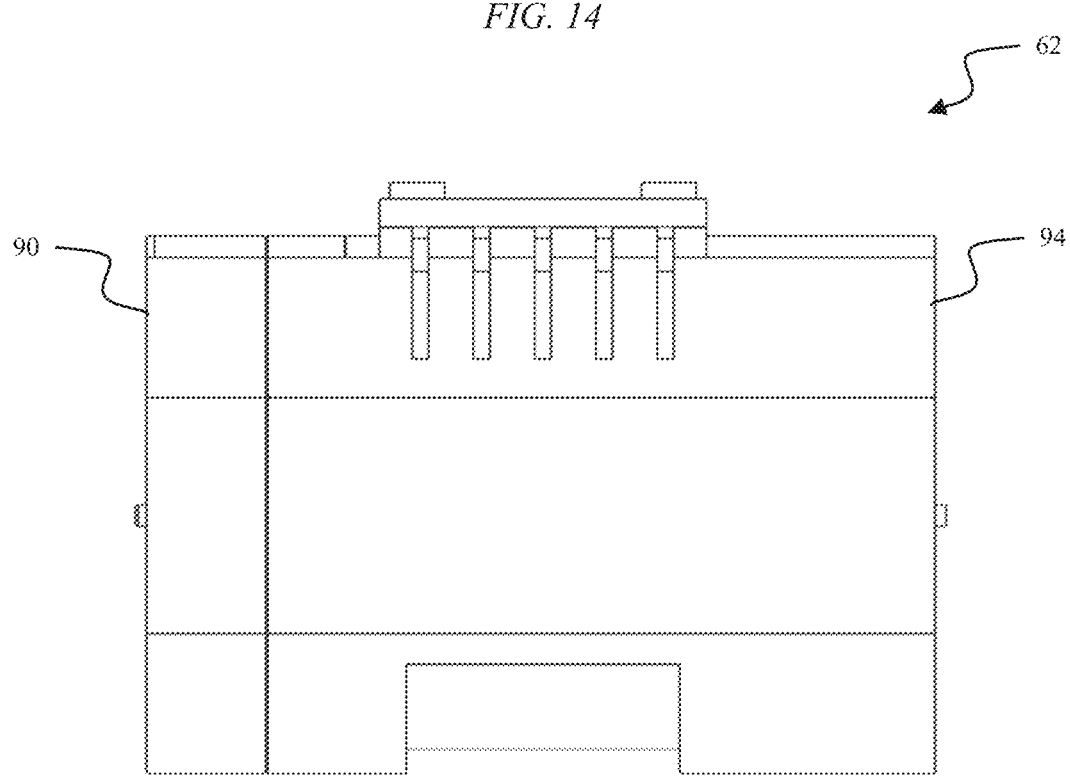
FIG. 14 is a rear view of the portion of the cell module of FIG. 12.
Figure 15:
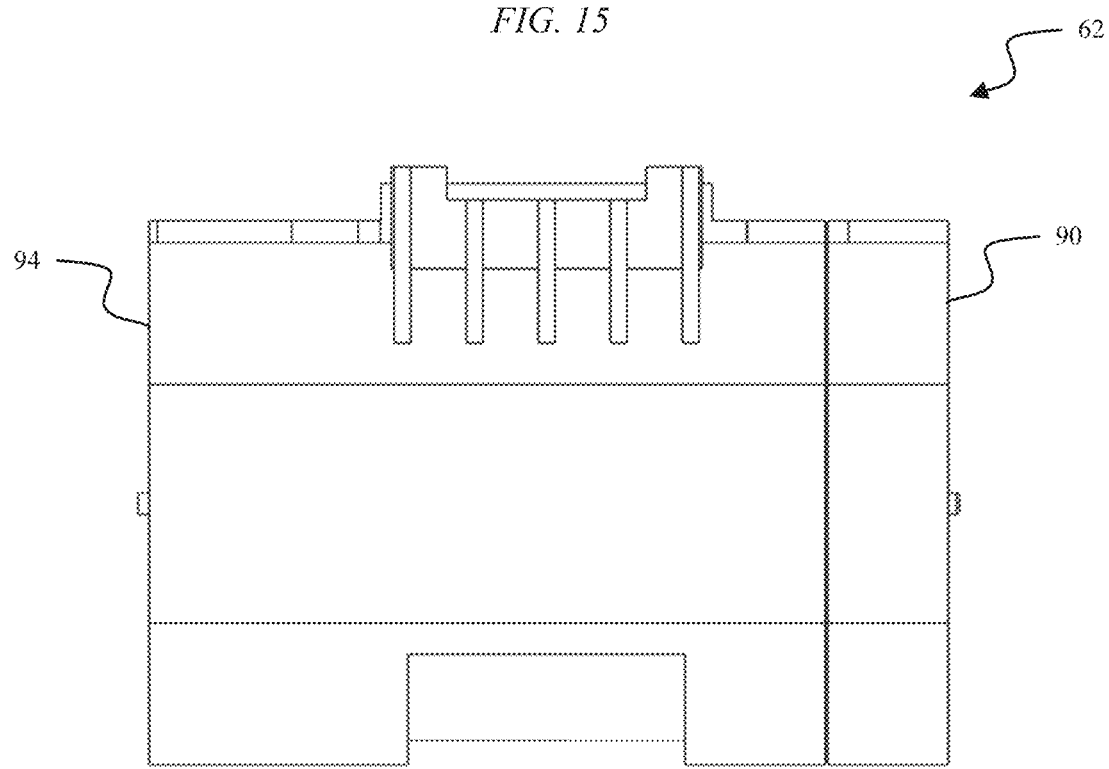
FIG. 15 is a front view of the portion of the cell module of FIG. 12.
Figure 16:
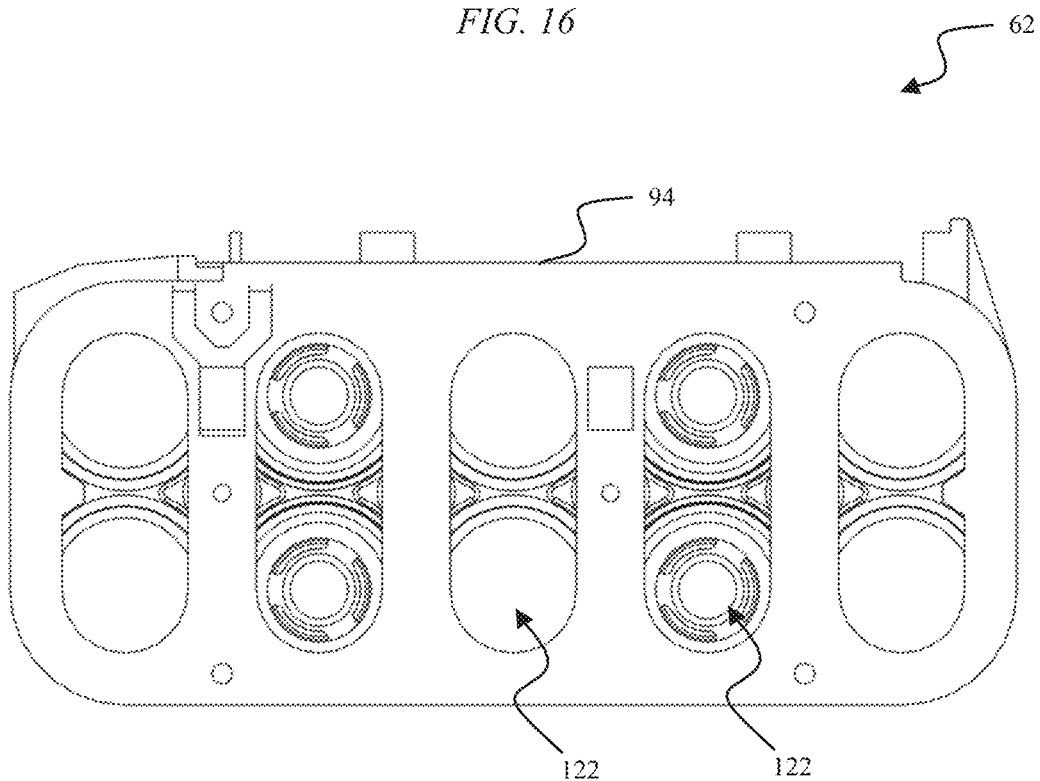
FIG. 16 is a side view of the portion of the cell module of FIG. 12.
Figure 17:
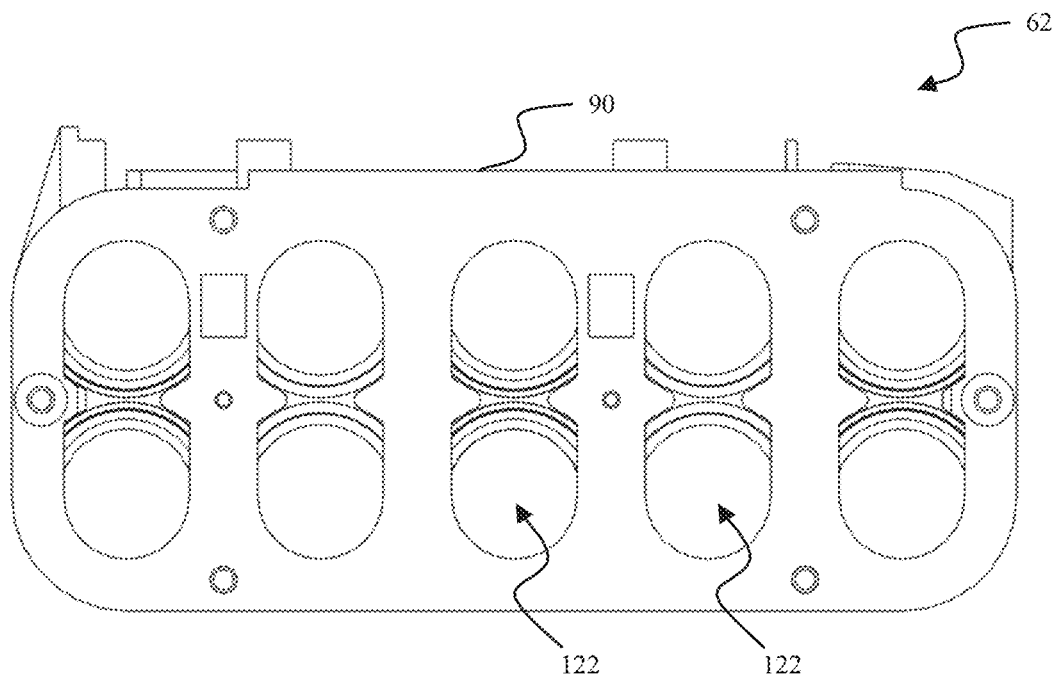
FIG. 17 is another side view of the portion of the cell module of FIG. 12.
Figure 18:
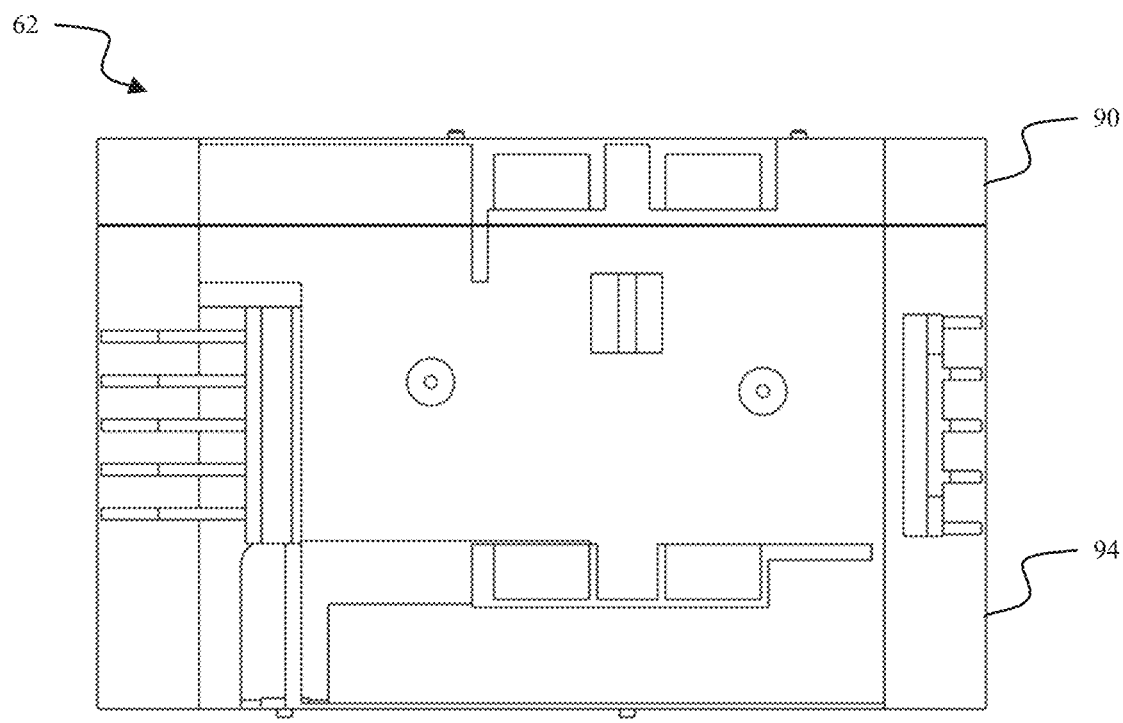
FIG. 18 is a top view of the portion of the cell module of FIG. 12.
Figure 19:
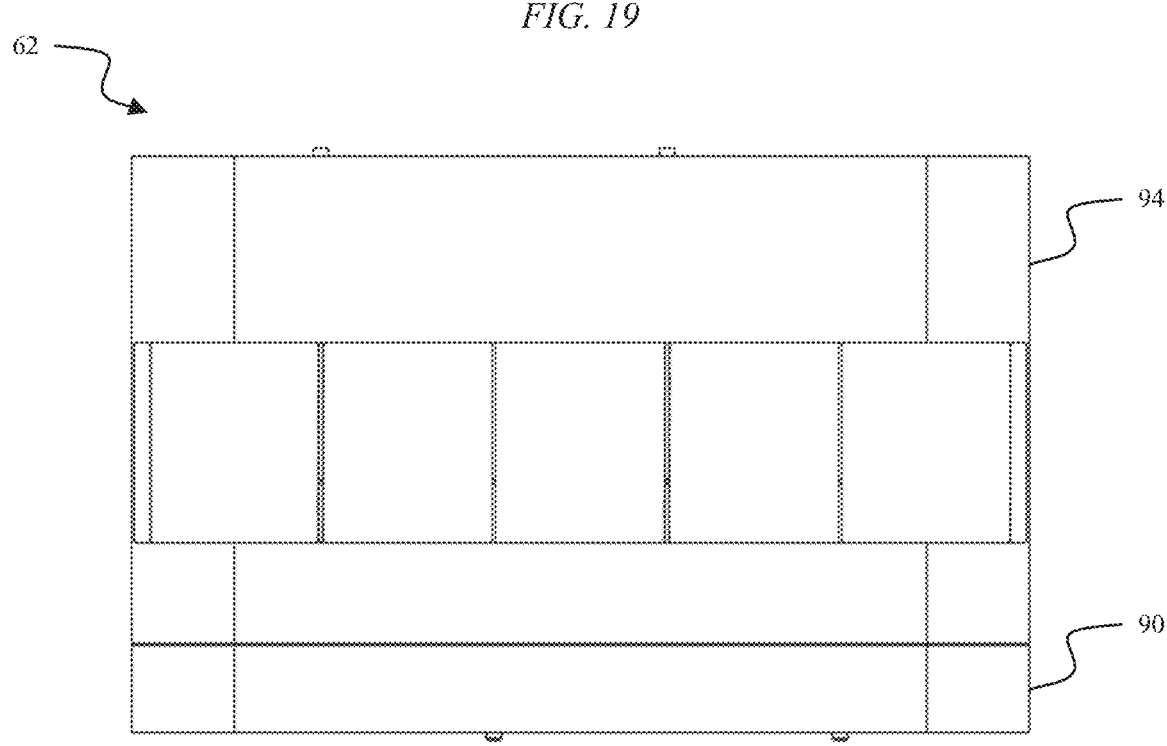
FIG. 19 is a bottom view of the portion of the cell module of FIG. 12.
Figure 20:
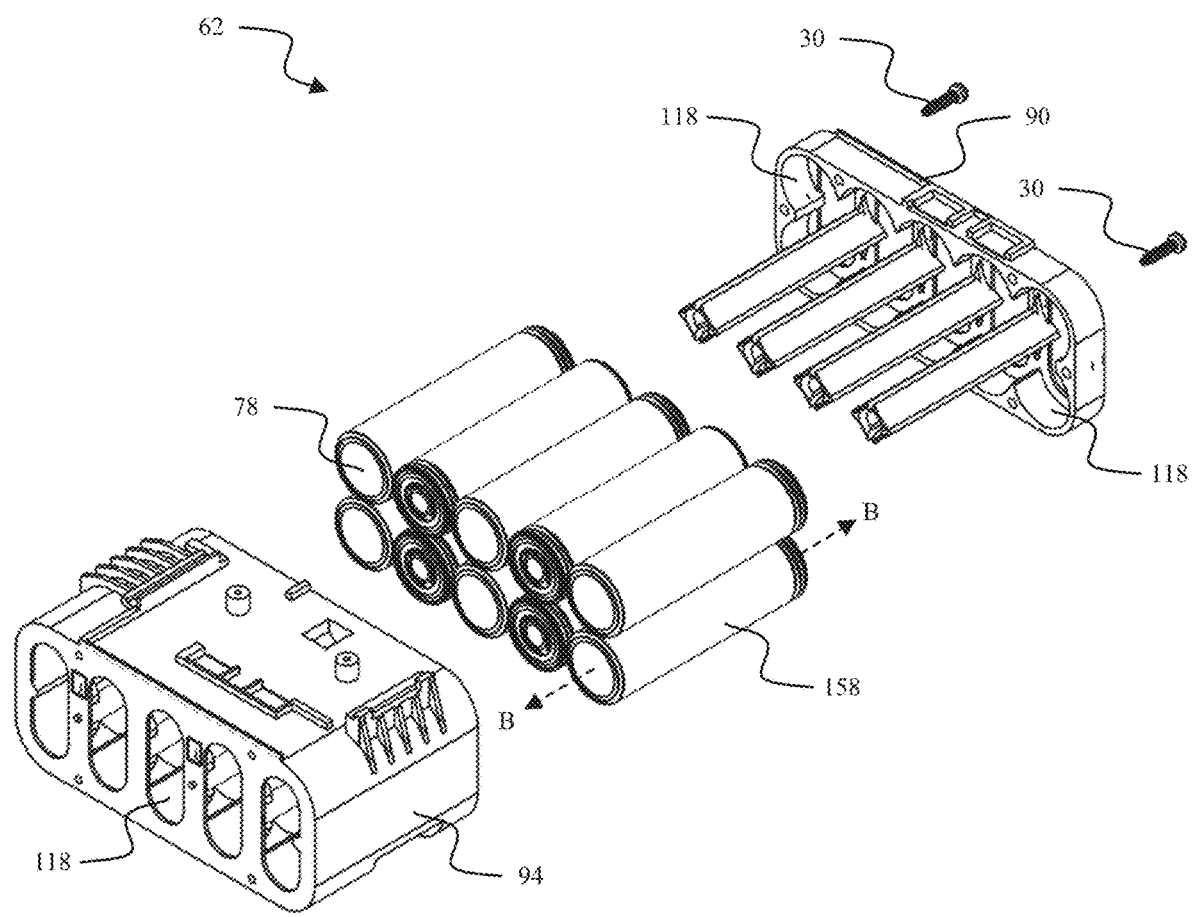
FIG. 20 is an exploded view of the portion of the cell module of FIG. 12.
Figure 21:
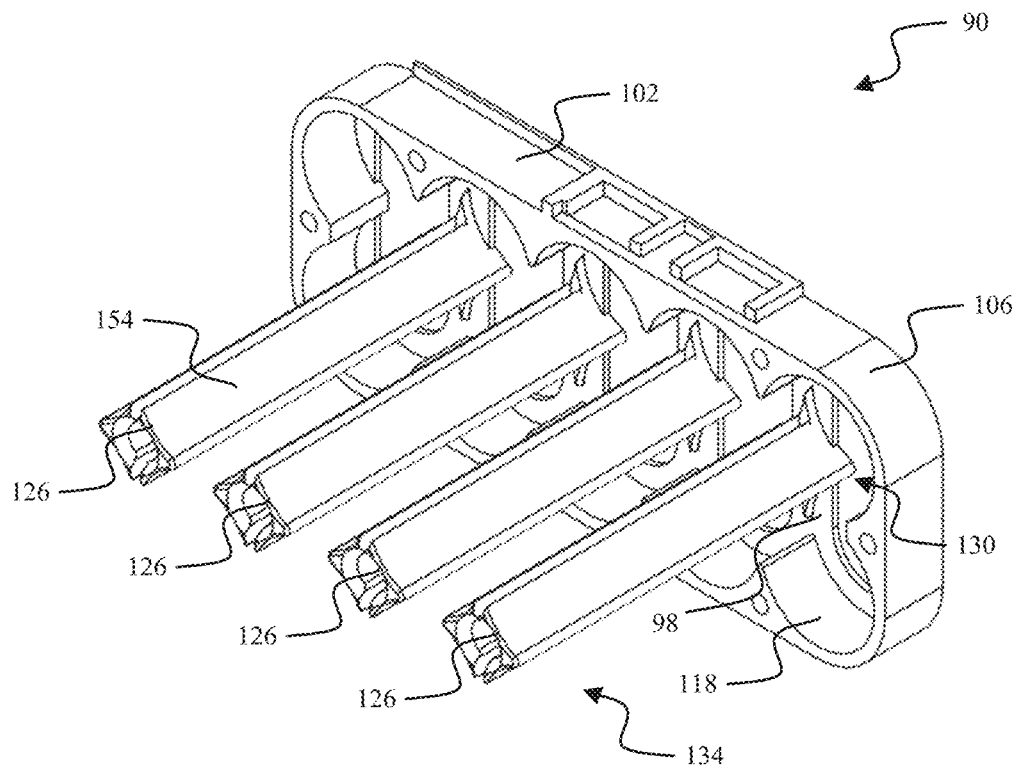
FIG. 21 is a top perspective view of a first frame half of the module frame shown in FIG. 12.
Figure 22:
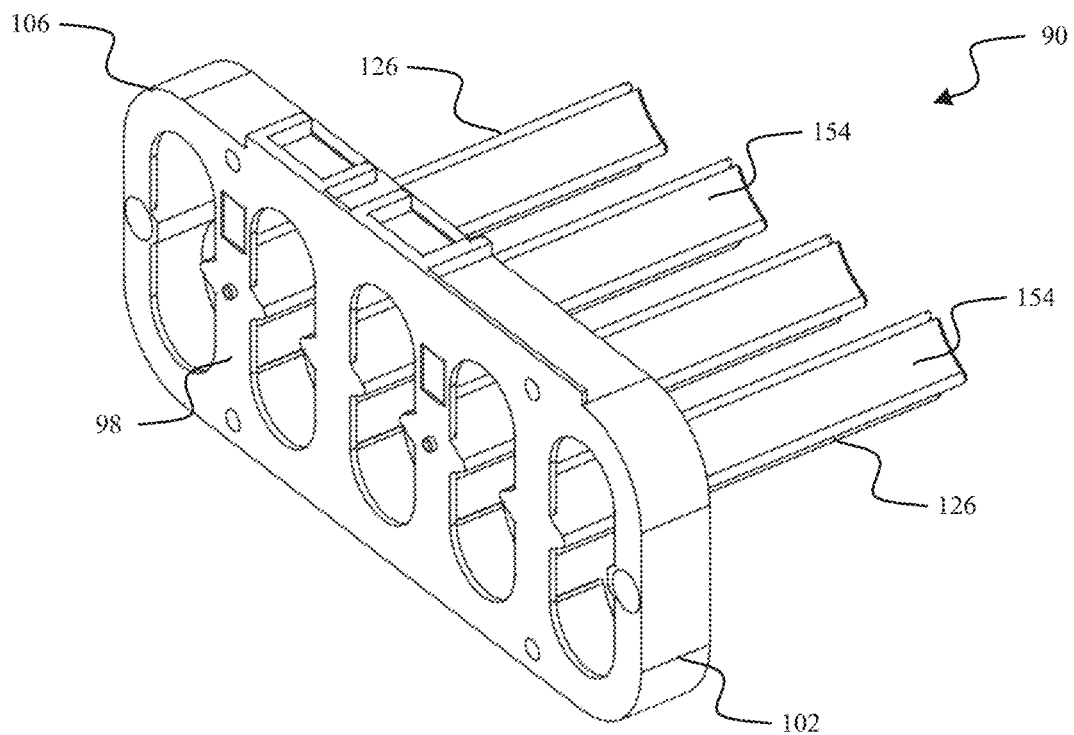
FIG. 22 is another top perspective view of the first frame half of FIG. 21.
Figure 23:
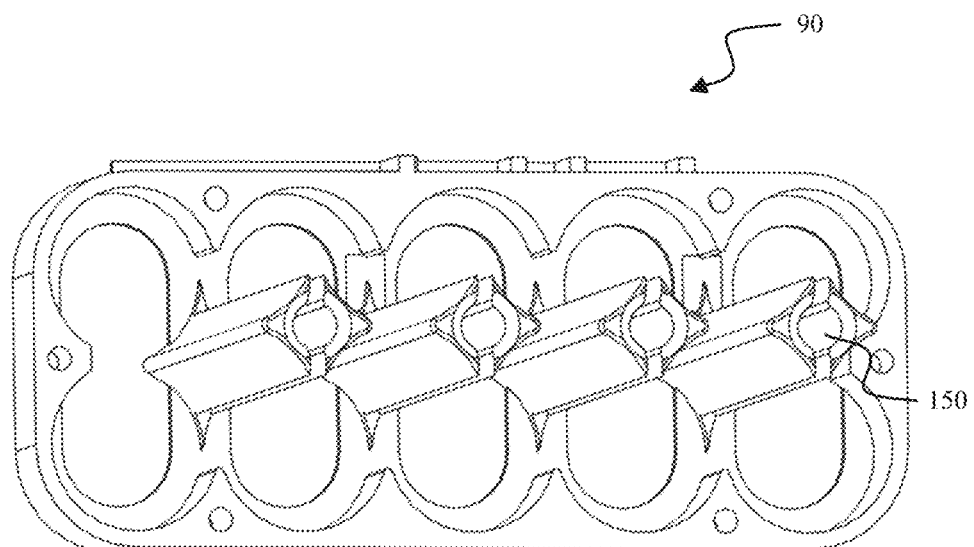
FIG. 23 is an inner perspective view of the first frame half of FIG. 21.
Figure 24:
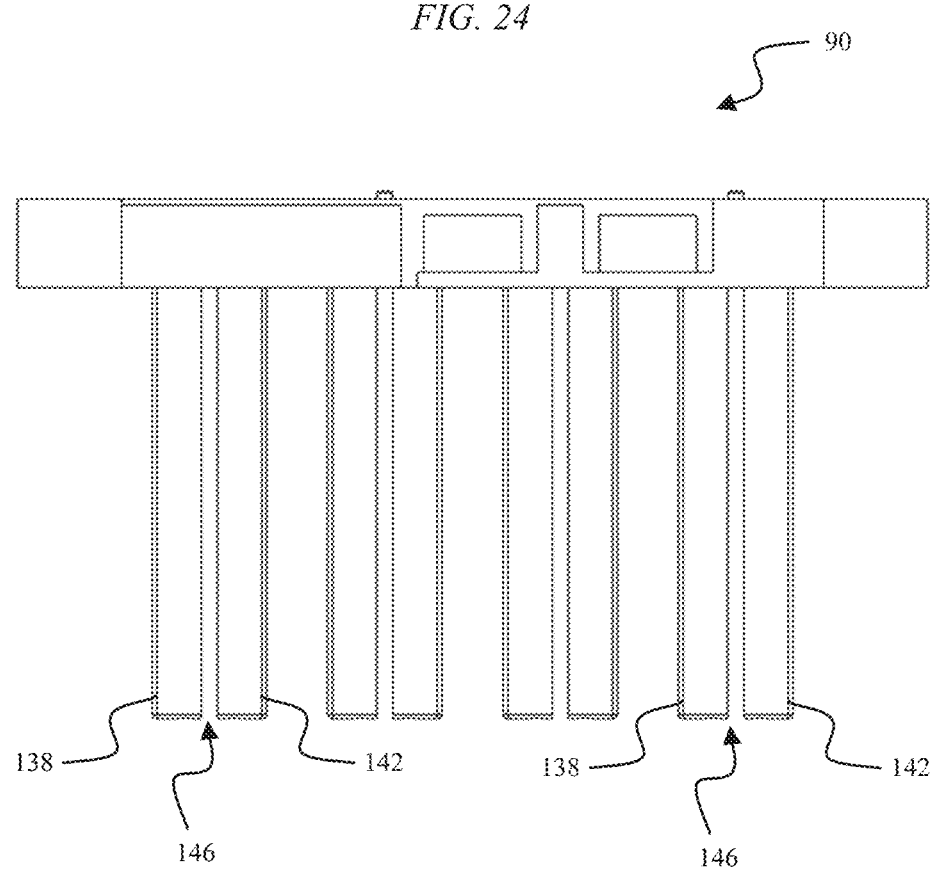
FIG. 24 is a top view of the first frame half of FIG. 21.
Figure 25:
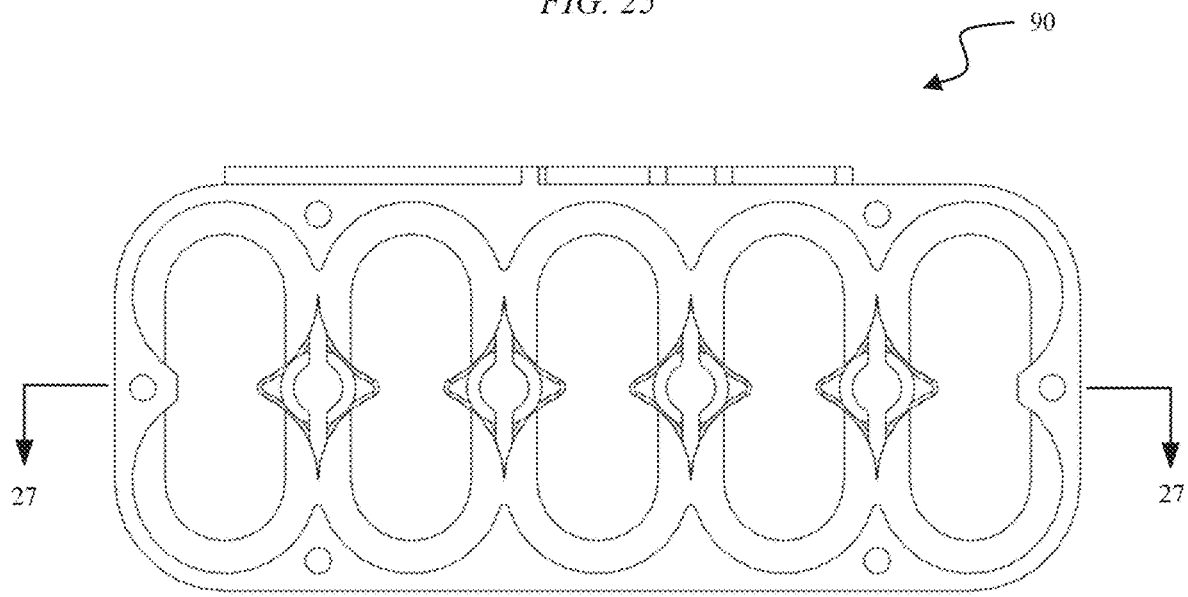
FIG. 25 is an inner side view of the first frame half of FIG. 21.
Figure 26:
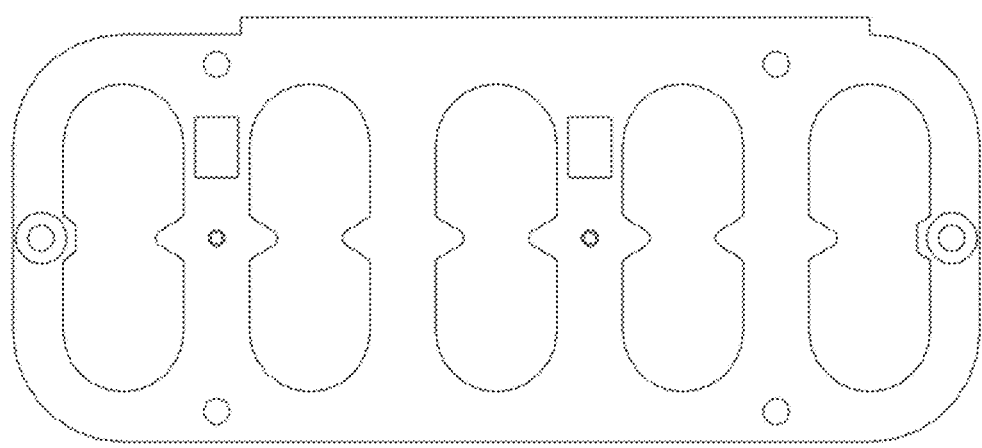
FIG. 26 is an outer side view of the first frame half of FIG. 21.
Figure 27:
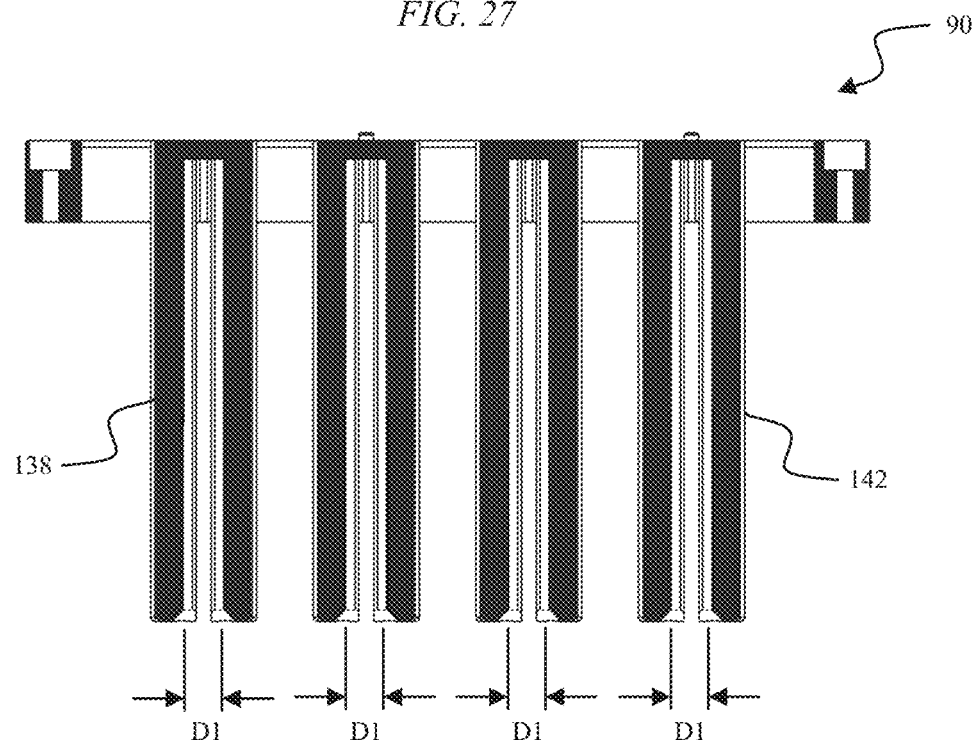
FIG. 27 is a cross-sectional view of the first frame half of FIG. 21, taken generally along line 27-27 in FIG. 25.
Figure 28:
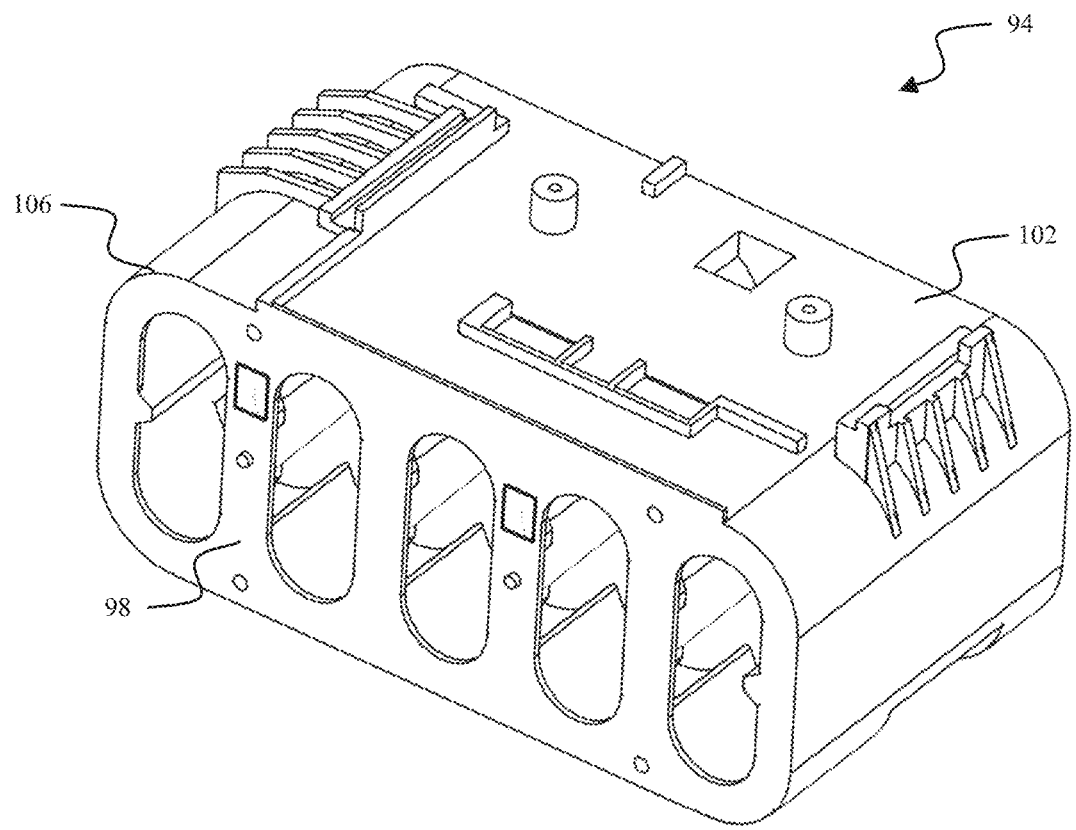
FIG. 28 is a perspective view of a second frame half of the module frame shown in FIG. 12.
Figure 29:
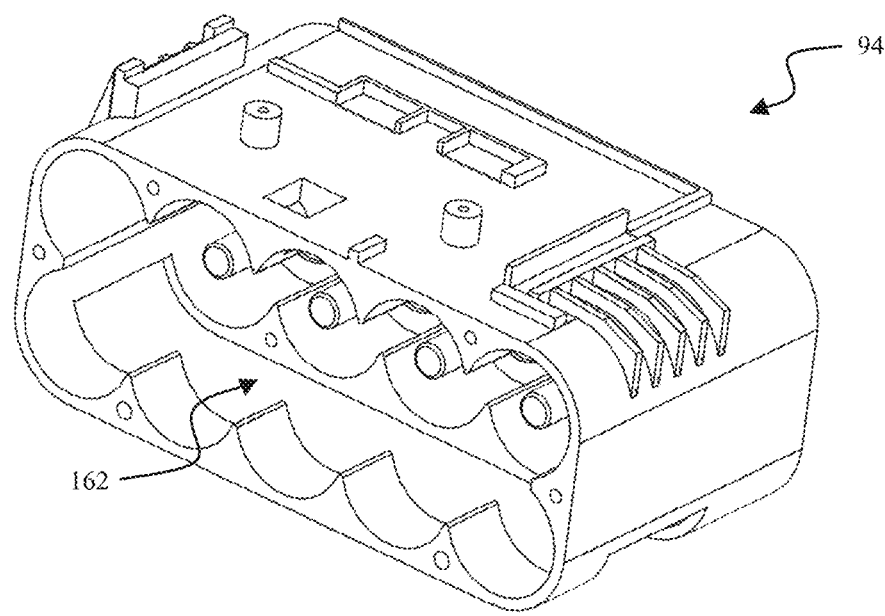
FIG. 29 is another perspective view of the second frame half of FIG. 28.
Figure 30:
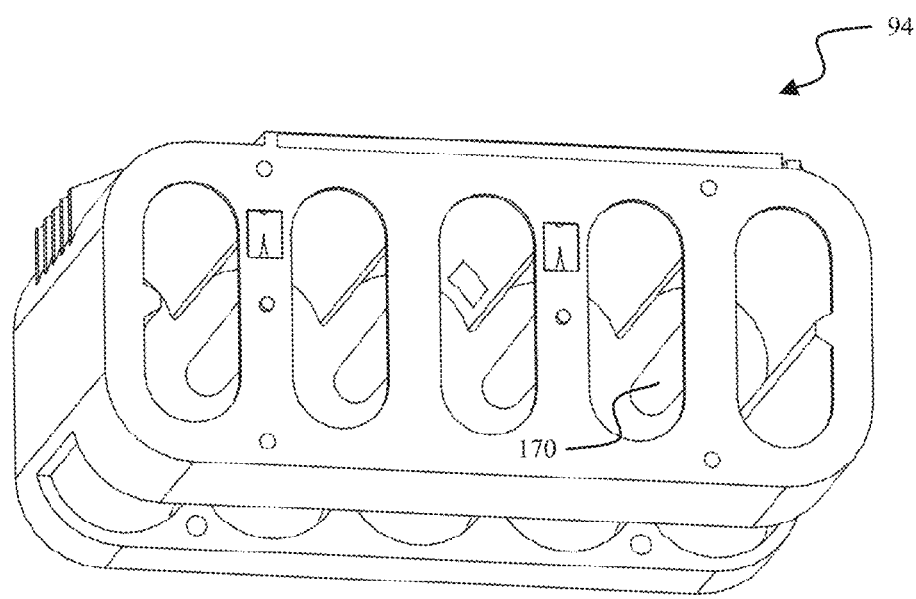
FIG. 30 is another perspective view of the second frame half of FIG. 28.
Figure 31:
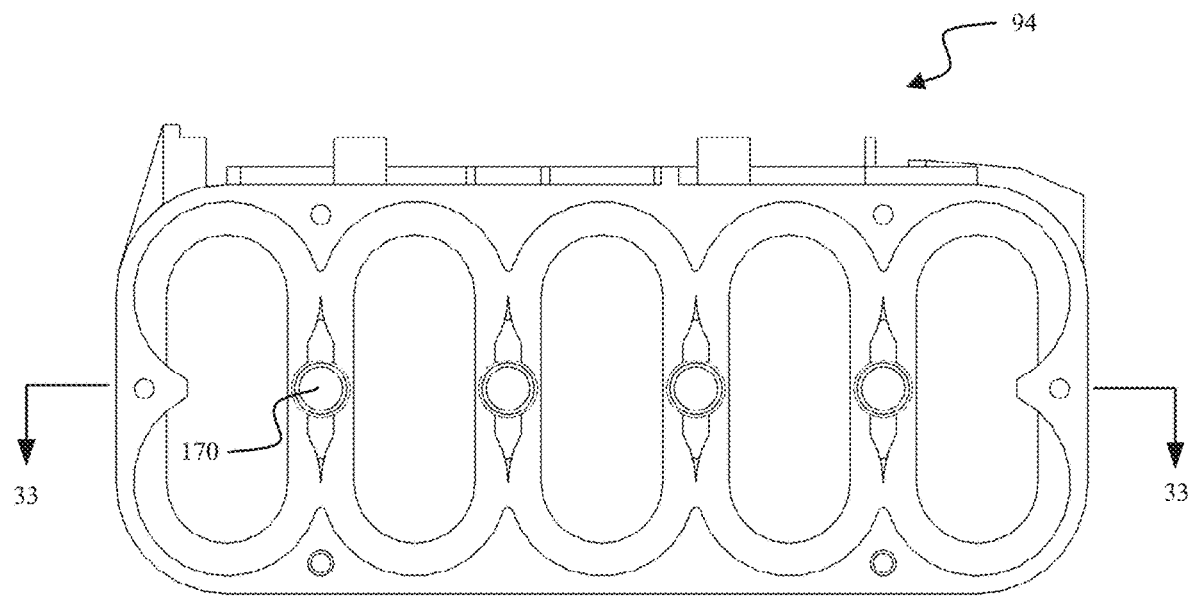
FIG. 31 is an inner side view of the second frame half of FIG. 28.
Figure 32:
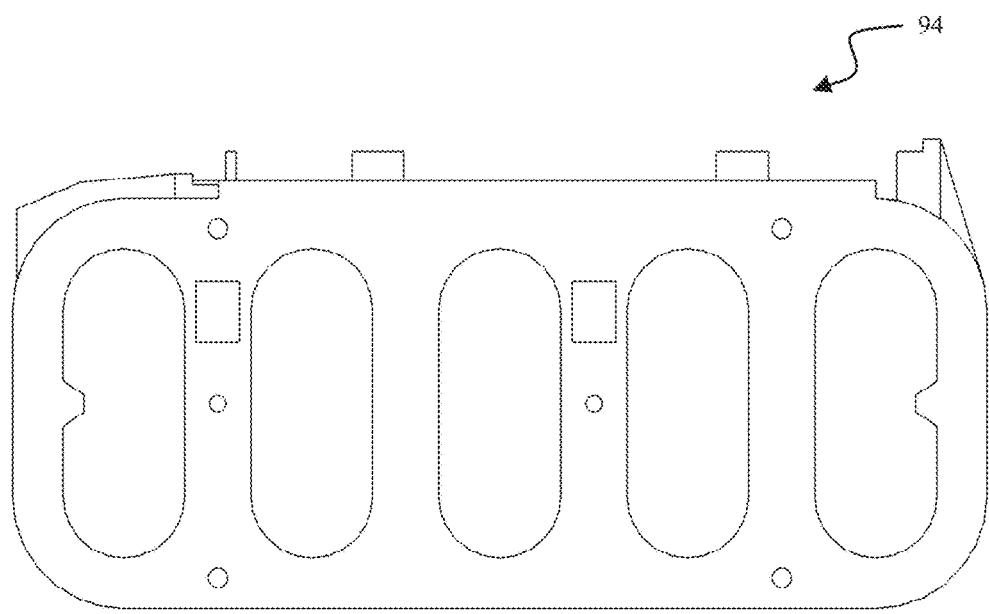
FIG. 32 is an outer side view of the second frame half of FIG. 28.

The upper case portion 18 includes a mounting portion 42, which is symmetrical about a longitudinal axis A of the battery pack 10, and configured to selectively couple to the electrical device. Terminal openings 46 are formed in the mounting portion 42 adjacent battery pack terminals 50 (see FIG. 10). The terminal openings 46 provide access to the battery pack terminals 50 to provide an electrical connection between the battery pack 10 and the electrical device. On each side, the upper case portion 18 defines latch windows 54, 58, which accommodate a latch member.

With reference to FIGS. 8-11, the battery pack 10 includes a battery cell module 62 configured to be supported at least partially or completely inside the case 14 within the internal compartment C. The cell module 62 includes a module frame 66 that supports battery cells 70 in a compact arrangement within the battery pack 10. Cell straps 74 extend along outer surfaces of the module frame 66 and electrically connect cell terminals 78 of the battery cells 70 with the battery pack terminals 50. The battery pack terminals 50 are supported by a terminal block 82 that, in the illustrated construction, is coupled to the module frame 66 with fasteners (e.g., screws). A printed circuit board ("PCB") 86 is coupled to the module frame 66 and electrically connected with the battery pack terminals 50 and the battery cells 70.

Figure 35:
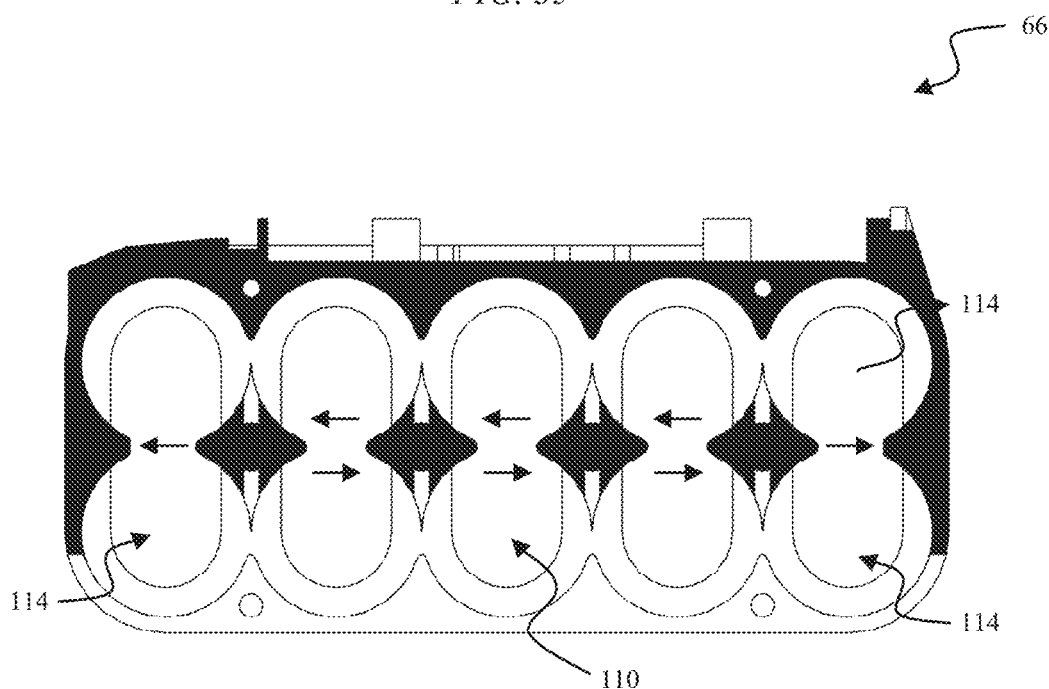
FIG. 35 is a side cross-sectional view of the module frame of FIG. 34, taken generally along line 35-35 in FIG. 34.

FIGS. 12-20 illustrate the module frame 66 with the battery cells 70 supported therein. The module frame 66 includes first and second frame halves 90, 94 connected, in the illustrated construction, with threaded fasteners 30 (e.g., screws). Each frame half 90, 94 includes an end wall 98 and a sidewall 102 extending away from a perimeter edge 106 of and generally orthogonal to the end wall 98. When assembled, the frame halves 90, 94 define a cell compartment 110 (see FIG. 35) in which the battery cells 70 are positioned and secured. The battery cells 70 extend along respective axes B (see FIG. 20), and the frame halves 90, 94 support the opposite axial ends of each cell 70.

The cell compartment 110 defines receptacles 114 (see FIG. 35), each receiving a battery cell 70. In the illustrated construction, the cells 70 are oriented transverse to the longitudinal axis A of the battery pack 10 and are stacked in two rows, with the terminals 78 of two cells 70 being accessible through an associated cell opening 114. In other constructions, the battery pack 10 may include battery cells 70 arranged in more than or fewer than two rows. The cell receptacles 114 are illustrated as having an at least partially cylindrical shape. However, in other constructions, the cell receptacles 114 have a different size and/or shape (e.g., circular, rectangular, etc.).

Each sidewall 102 defines annular grooves 118 (see FIG. 20), with each annular groove 118 being configured to receive a portion of an associated battery cell 70. A cell strap opening 122 (see FIG. 16) is provided for each battery cell 70, so that when the cell module 62 is assembled, the terminal 78 of an associated battery cell 70 is accessible through the cell strap opening 122.

With reference to FIGS. 21-27, the first frame half 90 includes elongated, cantilevered wedge members 126 having one end 130 affixed or connected (e.g., integrally) to the end wall 98 and an opposite free end 134. The wedge members 126 extend generally orthogonal to the end wall 98 to the free end 134, and generally parallel to the sidewall 102.

Each wedge member 126 includes a number of wedge portions (e.g., parallel first and second wedge halves 138, 142 [FIG. 24]) separated by a gap 146. In the illustrated construction, a post opening 150 (see FIG. 23) is defined between the wedge halves 138, 142. Each illustrated post opening 150 has a generally circular cross-section of a constant first diameter D1 (see FIG. 27) between the fixed end 130 and the free end 134 (i.e., along the length of each wedge member). In other constructions, the post opening 150 are tapered.

Figure 39:
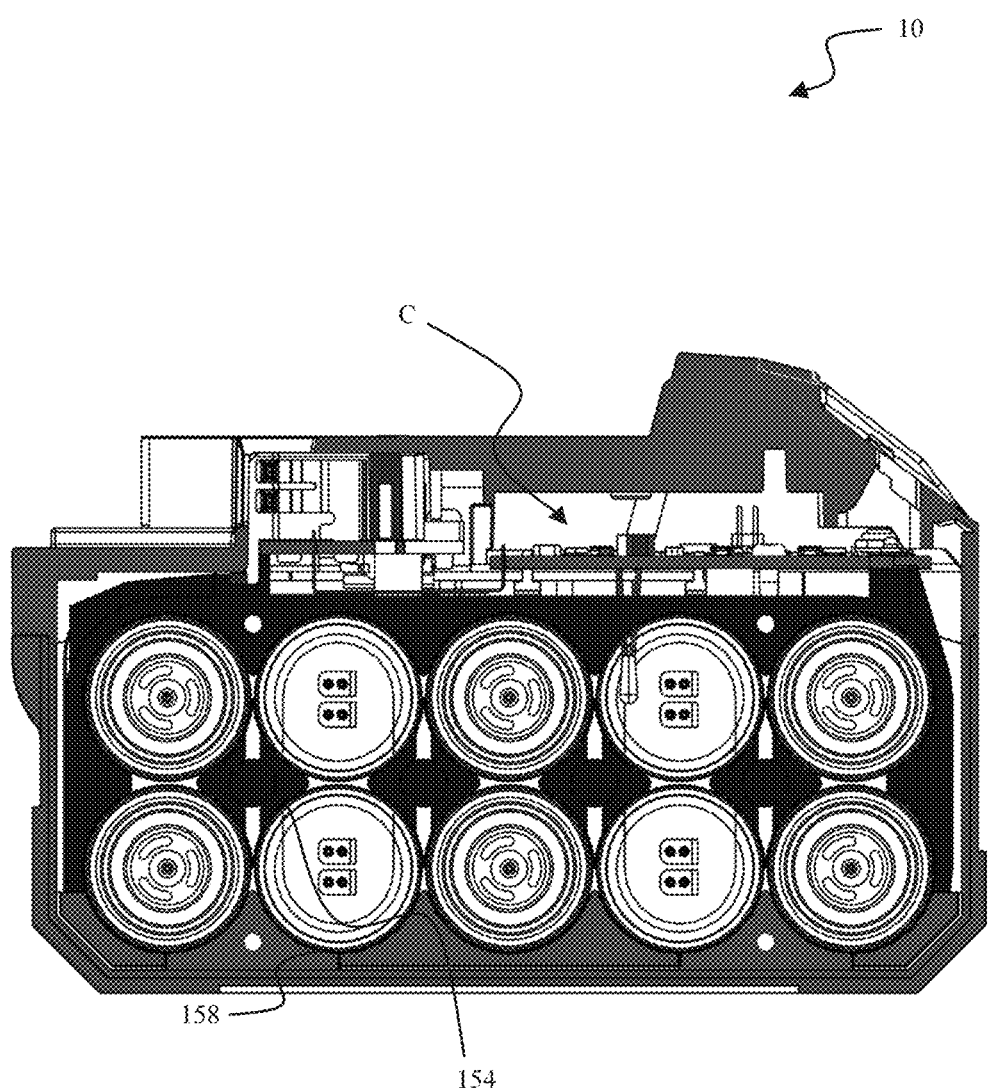
FIG. 39 is a cross sectional view of the battery pack of FIG. 1, taken generally along line 39-39 in FIG. 6.

The wedge members 126 also include recessed annular surfaces 154. Each annular surface 154 defines a respective portion of the cell receptacles 114. Thus, when the cell module 62 is assembled, the annular surfaces 154 configured to contact and support circumferential walls 158 (see FIG. 20) of the respective battery cells 70, as shown in FIG. 39.

The wedge halves 138, 142 are each formed of a relatively flexible and resilient material (e.g., polyethylene, etc.) so as to be capable of elastically bending or flaring apart from one another. In the illustrated construction, the wedge members 126 are formed integrally with the first frame half 90.

With reference to FIGS. 28-33, in the illustrated construction, the second frame half 94 defines a window 162 (see FIG. 13) in a bottom portion of the sidewall 102. When the cell module 62 is assembled, the cell window 162 exposes portions of the battery cells 70 (see FIG. 11). The lower case portions 22, 26 include wedge-shaped projections 166 (see FIG. 8) shaped to conform to the exposed portions of the battery cells 70. When the battery pack 10 is assembled, the projections 166 pass through the cell window 162 to engage the exposed portions of the battery cells 70. Thus, the projections 166 cooperate with the battery cells 70 to properly align the cell module 62 within the case 14.

Figure 33:
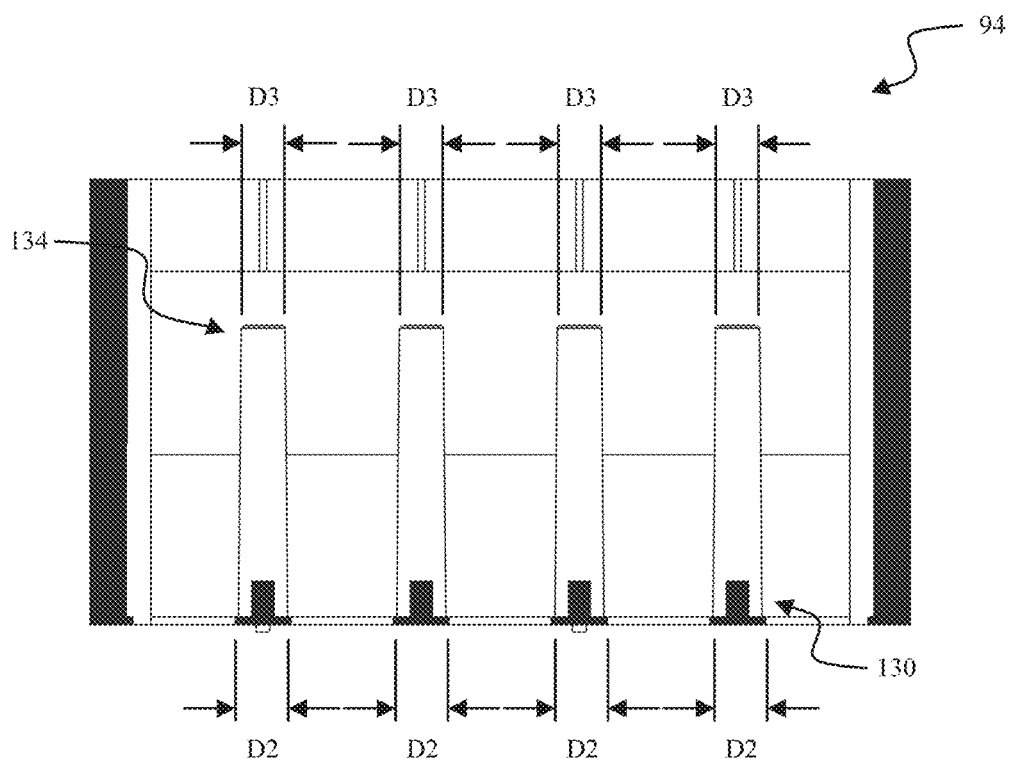
FIG. 33 is a cross-sectional view of the second frame half of FIG. 28, taken generally along line 33-33 in FIG. 31.
Figure 34:
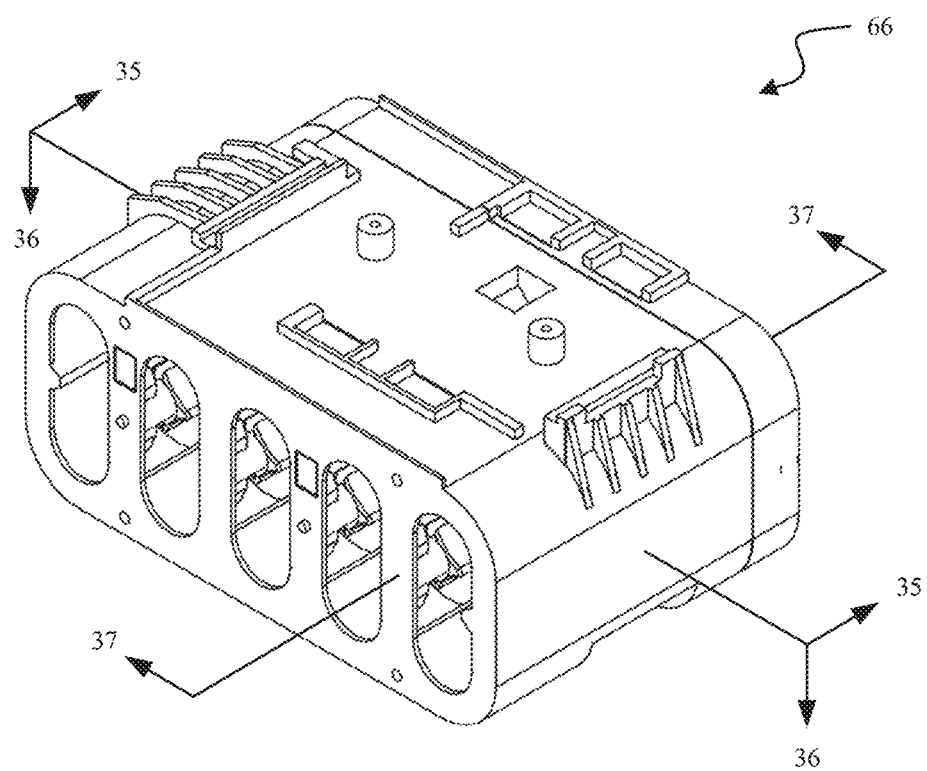
FIG. 34 is a perspective view of the assembled module frame of the cell module of FIG. 10.

The second frame half 94 further includes elongated, cantilevered posts 170 having one end 130 affixed or connected (e.g., integrally) to the end wall 98 and an opposite, free end 134 (see FIG. 33). The posts 170 extend generally orthogonal to the end wall 98 to the free end 134 and generally parallel to the sidewall 102. Each post 170 corresponds to a post opening 150 formed in an associated wedge member 126. When the module frame 66 is assembled, the posts 170 are configured to be inserted into and engage the surface of the post openings 150.

In the illustrated construction, the posts 170 have a cross-section shape to conform to a cross-sectional shape of the post openings 150. In other constructions, the posts may include other cross-sectional shapes (e.g., polygonal, etc.) complementary to or cooperating with the cross-sectional shapes of the post openings 150.

With reference to FIG. 33, in the illustrated construction, each post 170 tapers (e.g., narrows) from a larger, second diameter D2 at the fixed end 130 to a smaller, third diameter D3 at the free end 134. In the illustrated construction, the third diameter D3 at the free end 134 is less than or equal to the first diameter D1 of the post opening 150, while the second diameter D2 at the fixed end 130 is greater than the first diameter D1. In other constructions with posts having non-circular cross-sectional shapes, the posts may have a larger cross-sectional area proximate the fixed end and progressively taper to a smaller cross-sectional area proximate the free end.

In other constructions, the wedge members 126 and the posts 170 may be reversed on the frame halves 90, 94. In still other constructions, wedge members 126 and posts 170 may be provided alternatingly on both frame halves 90, 94.

To assemble the cell module 62, the battery cells 70 are positioned in the cell receptacles 114. The cell receptacles 114 are slightly oversized in relation to the size of the battery cells 70 so that, before the posts 170 are inserted into the post openings 150, the cells 70 rest somewhat loosely within the cell receptacles 114.

Figure 36:
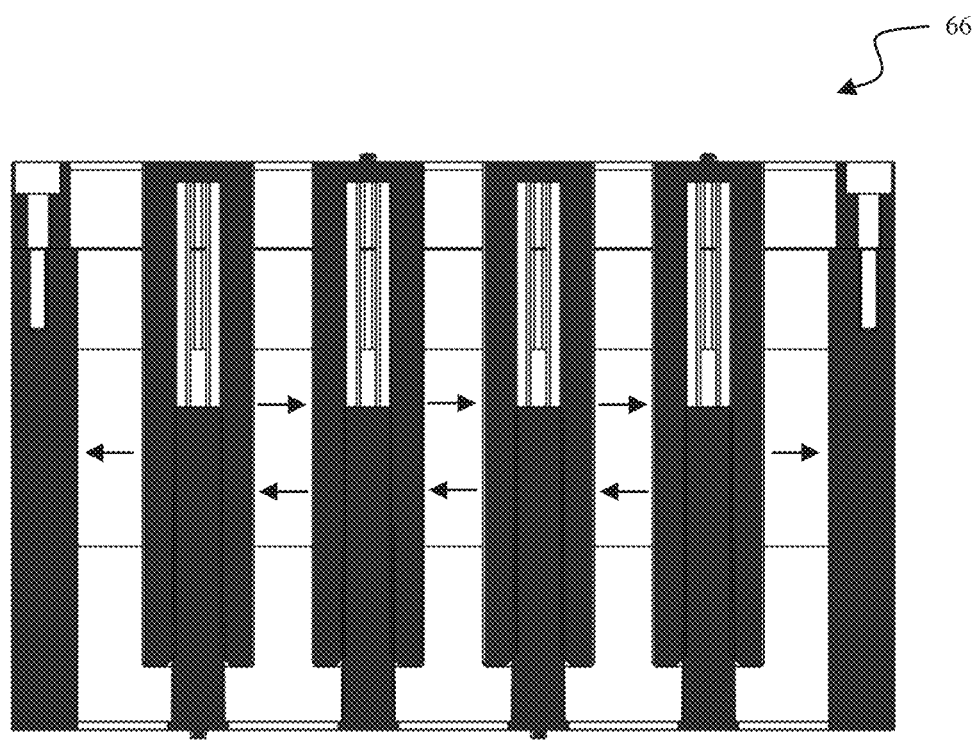
FIG. 36 is a cross-sectional top view of the module frame of FIG. 34, taken generally along line 36-36 in FIG. 34.
Figure 37:
FIG. 37 is a cross-sectional front view of the module frame of FIG. 34, taken generally along line 37-37 in FIG. 34.
Figure 38:
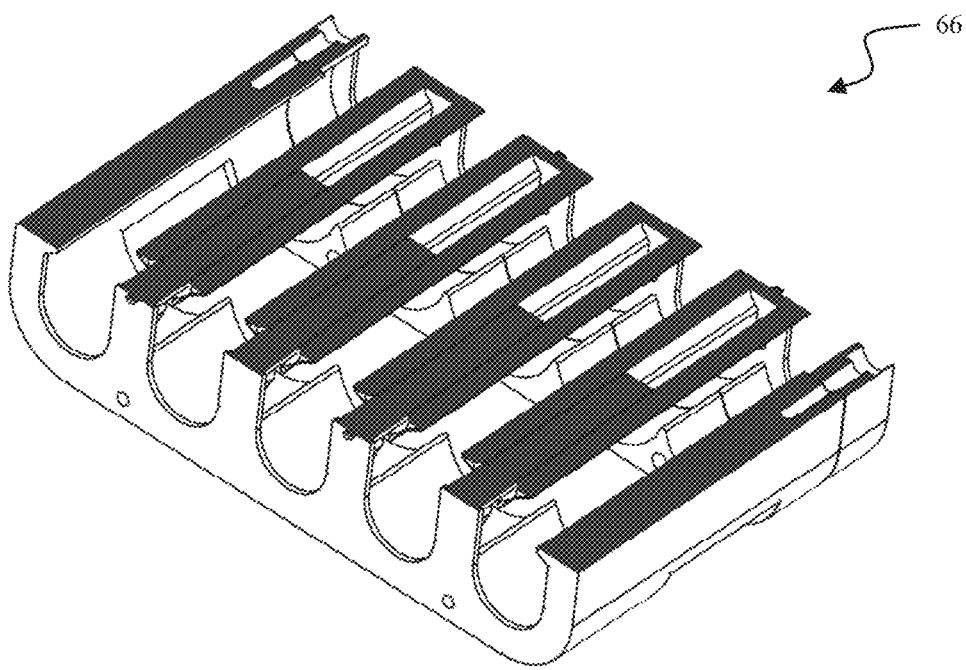
FIG. 38 is a cross-sectional top perspective view of the module frame of FIG. 34, taken generally along line 35-35 in FIG. 34.

The posts 170 on the second frame half 94 are inserted into the post openings 150 of the first frame half 90, and the frame halves 90, 94 are pressed toward one another until the frame halves 90, 94 reach and contact one another. As each post 170 advances into the associated post opening 150, the tapered shape of the post 170 "activates" the wedge member 126 (e.g., causes the wedge halves 138, 142 to progressively flare away from one another [in the direction of the arrows illustrated in FIGS. 35-36]). As the wedge halves 138, 142 are forced apart by the posts 170, the wedge halves 138, 142 contact and press against the walls 158 of the battery cells 70 to fix the cells 70 in place within the frame 66 (see FIG. 38). The posts 170 cause the wedge members 126 to selectively exert a compressive force on the battery cells 70. The compressive force is directed into the battery cells 70 to fully secure the battery cells 70 within the cell module 62 in all directions. In some embodiments, the wedge members 126 and posts 170 help eliminate any need to use rubber in the battery pack 10. As a result, in some embodiments, the battery pack 10 is manufactured such that the battery pack 10 includes no rubber.

Thus, embodiments described herein provide, among other things, a battery pack and a battery cell module that is configured to support a battery cell. Various features and advantages are set forth in the following claims.

What is claimed is:

1. A battery pack comprising:
   a housing;
   a plurality of battery cells located within the housing;
   a battery cell module at least partially located within the housing, the battery cell module configured to support the plurality of battery cells, the battery cell module including:
      a frame including a first frame half and a second frame half, the first frame half and the second frame half defining a battery cell compartment for receiving the plurality of battery cells,
      the first frame half including:
         a first end wall,
         an elastically bendable wedge member affixed to the first end wall, the wedge member including a first wedge portion and a second wedge portion, the first wedge portion and the second wedge portion defining a post opening having a circular cross-section,
      the second frame half including:
         a second end wall,
         a post affixed to the second end wall at a first end of the post,
      wherein the post is configured to be inserted into the post opening of the wedge member.

2. The battery pack of claim 1, wherein the circular cross-section has a first diameter along the length of the wedge member.

3. The battery pack of claim 2, wherein the wedge member includes a plurality of annular surfaces.

4. The battery pack of claim 3, wherein each of the plurality of annular surfaces is configured to contact and support a circumferential wall of one of the plurality of battery cells.

5. The battery pack of claim 2, wherein:
   the post has a second diameter at the first end of the post and a third diameter at a second end of the post; and
   the third diameter is smaller than the second diameter.

6. The battery pack of claim 5, wherein the third diameter is smaller than the first diameter.

7. A battery pack comprising:
   a housing;
   a plurality of battery cells located within the housing;
   a battery cell module at least partially located within the housing, the battery cell module configured to support the plurality of battery cells, the battery cell module including:
      a frame including a first frame half and a second frame half, the first frame half and the second frame half defining a battery cell compartment for receiving the plurality of battery cells,
      the first frame half including:
         a first end wall,
         a wedge member connected to the first end wall, the wedge member including a first wedge portion and a second wedge portion, the first wedge portion and the second wedge portion defining a post opening,
      the second frame half including:
         a second end wall,
         a post connected to the second end wall at a first end of the post,
      wherein the post is configured to be inserted into the post opening of the wedge member.

8. The battery pack of claim 7, wherein the post opening has a circular cross-section.

9. The battery pack of claim 8, wherein the circular cross-section has a first diameter along the length of the wedge member.

10. The battery pack of claim 9, wherein the wedge member includes an annular surface.

11. The battery pack of claim 10, wherein the annular surface is configured to contact and support a circumferential wall of one of the plurality of battery cells.

12. The battery pack of claim 9, wherein:
   the post has a second diameter at the first end of the post and a third diameter at a second end of the post; and
   the third diameter is smaller than the second diameter.

13. The battery pack of claim 12, wherein the third diameter is smaller than the first diameter.

14. The battery pack of claim 13, wherein the wedge member is made of an elastically bendable material.

15. A battery cell module configured to be at least partially located within a housing of a battery pack, the battery cell module comprising:
 a frame including a first frame half and a second frame half, the first frame half and the second frame half defining a battery cell compartment for receiving a battery cell,
 the first frame half including:
  a first end wall,
  a wedge member connected to the first end wall, the wedge member including a first wedge portion and a second wedge portion, the first wedge portion and the second wedge portion defining a post opening,
 the second frame half including:
  a second end wall,
  a post connected to the second end wall at a first end of the post,
  wherein the post is configured to be inserted into the post opening of the wedge member.

16. The battery cell module of claim 15, wherein the post opening has a circular cross-section having a first diameter along the length of the wedge member.

17. The battery cell module of claim 16, wherein the wedge member includes an annular surface.

18. The battery cell module of claim 17, wherein the annular surface is configured to contact and support a circumferential wall of the battery cell.

19. The battery cell module of claim 16, wherein:
 the post has a second diameter at the first end of the post and a third diameter at a second end of the post;
 the third diameter is smaller than the second diameter; and
 the third diameter is smaller than the first diameter.

20. The battery cell module of claim 19, wherein wedge member is made of an elastically bendable material.

* * * * *